(12) United States Patent
Isaki et al.

(10) Patent No.: US 11,426,977 B2
(45) Date of Patent: Aug. 30, 2022

(54) LAMINATE AND METHOD FOR PRODUCING SAME

(71) Applicant: Mitsui Chemicals, Inc., Tokyo (JP)

(72) Inventors: Takeharu Isaki, Chiba (JP); Sunao Maeda, Chiba (JP); Masako Yoshida, Chiba (JP); Yuichi Itou, Ichihara (JP); Kazuaki Kikuchi, Mobara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 80 days.

(21) Appl. No.: 16/498,590

(22) PCT Filed: Mar. 27, 2018

(86) PCT No.: PCT/JP2018/012396
§ 371 (c)(1),
(2) Date: Sep. 27, 2019

(87) PCT Pub. No.: WO2018/181290
PCT Pub. Date: Oct. 4, 2018

(65) Prior Publication Data
US 2021/0114349 A1    Apr. 22, 2021

(30) Foreign Application Priority Data

Mar. 29, 2017  (JP) .............................. JP2017-064841
Jul. 11, 2017   (JP) .............................. JP2017-135810
(Continued)

(51) Int. Cl.
*B32B 15/14* (2006.01)
*B29C 65/16* (2006.01)
(Continued)

(52) U.S. Cl.
CPC .......... *B32B 15/14* (2013.01); *B29C 65/1616* (2013.01); *B29C 65/1635* (2013.01);
(Continued)

(58) Field of Classification Search
CPC ............ A61F 13/4902; A61F 13/15731; A61F 13/15739; A61F 13/15764;
(Continued)

(56) References Cited

U.S. PATENT DOCUMENTS 6,451,152 B1    9/2002   Holmes et al.
9,527,230 B2 *  12/2016  Takeuchi .............. B29C 66/524
(Continued)

FOREIGN PATENT DOCUMENTS

EP    2837491 A1 *   2/2015   ............. B29C 66/45
JP    H06107442 A    4/1994
(Continued)

OTHER PUBLICATIONS

Machine translation of JP2015080884; Inventor: Morikawa Shigeyasu; Publication date: Apr. 24, 20217.*
(Continued)

*Primary Examiner* — Vishal I Patel
(74) *Attorney, Agent, or Firm* — Buchanan Ingersoll & Rooney PC

(57) ABSTRACT

Disclosed are a method for producing a laminate including a step of laminating a resin impregnated fiber reinforced composition layer on a metal member, wherein the method includes
  a step of forming a resin coating on the metal member and
  a step of laminating a resin impregnated fiber reinforced composition layer containing a resin impregnated fiber reinforced composition containing
  (I) 20 to 80% by mass of a polymer having a melting point and/or a glass transition temperature of 50 to 300° C., and (Continued)

(C) 20 to 80% by mass of a reinforcing fiber (provided that the sum of the component (I) and the component (C) is taken as 100% by mass) via the above resin coating; and a laminate obtained by the method.

11 Claims, 6 Drawing Sheets

(30) Foreign Application Priority Data

Oct. 2, 2017 (JP) .............................. JP2017-192734
Dec. 12, 2017 (JP) .............................. JP2017-237903

(51) Int. Cl.

| | | |
|---|---|---|
| B29C 65/00 | (2006.01) | |
| B29C 70/32 | (2006.01) | |
| B29C 70/86 | (2006.01) | |
| B32B 1/02 | (2006.01) | |
| B32B 5/02 | (2006.01) | |
| B32B 37/24 | (2006.01) | |
| B29K 307/04 | (2006.01) | |
| B29K 507/04 | (2006.01) | |
| B29L 31/00 | (2006.01) | |

(52) U.S. Cl.
CPC ...... *B29C 65/1683* (2013.01); *B29C 66/1122* (2013.01); *B29C 66/45* (2013.01); *B29C 66/532* (2013.01); *B29C 66/72141* (2013.01); *B29C 66/72321* (2013.01); *B29C 66/73115* (2013.01); *B29C 66/73117* (2013.01); *B29C 66/742* (2013.01); *B29C 70/32* (2013.01); *B29C 70/86* (2013.01); *B32B 1/02* (2013.01); *B32B 5/02* (2013.01); *B32B 37/24* (2013.01); B29K 2307/04 (2013.01); B29K 2507/04 (2013.01); B29L 2031/7156 (2013.01); B32B 2037/243 (2013.01); B32B 2255/06 (2013.01); B32B 2255/26 (2013.01); B32B 2260/021 (2013.01); B32B 2260/046 (2013.01); B32B 2307/4026 (2013.01); B32B 2439/40 (2013.01); B32B 2603/00 (2013.01)

(58) Field of Classification Search
CPC ........... A61F 13/15593; B29C 66/1122; B29C 66/81433; B29C 66/21; B29C 66/73921; B29C 66/7294; B29C 66/83511; B29C 65/086; B29C 66/433; B29L 2031/4878; B29K 2995/0046; B32B 37/10; B32B 2555/02; B32B 5/022
See application file for complete search history.

(56) References Cited

U.S. PATENT DOCUMENTS

| | | |
|---|---|---|
| 2006/0258810 A1 | 11/2006 | Sugiura et al. |
| 2009/0062426 A1 | 3/2009 | Shiraki et al. |
| 2015/0064409 A1 | 3/2015 | Takeuchi et al. |
| 2015/0165703 A1* | 6/2015 | Shintani .................. B29C 53/66 156/172 |

FOREIGN PATENT DOCUMENTS

| | | |
|---|---|---|
| JP | H09257193 A | 9/1997 |
| JP | 2005048343 A | 2/2005 |
| JP | 2006124852 A | 5/2006 |
| JP | 2011116933 A | 6/2011 |
| JP | 2013108521 A | 6/2013 |
| JP | 2014030982 A | 2/2014 |
| JP | 2015080884 A | 4/2015 |
| JP | 2016221970 A | 12/2016 |
| JP | 2018034437 A | 3/2018 |
| WO | 2006101269 A1 | 9/2006 |
| WO | 2013146900 A1 | 10/2013 |

OTHER PUBLICATIONS

International Search Report (PCT/ISA/210) dated Jul. 3, 2018, by the Japan Patent Office as the International Searching Authority for International Application No. PCT/JP2018/012396.
Masui, T., The Research on the Superposition Point Junction of CFRP and Aluminum Alloy by Laser Junction, Reports of the Mie Prefecture Industrial Research Institute, No. 39, pp. 22-26, 2015.
Written Opinion (PCT/ISA/237) dated Jul. 3, 2018, by the Japan Patent Office as the International Searching Authority for International Application No. PCT/JP2018/012396.

* cited by examiner 101
102

LAMINATE AND METHOD FOR PRODUCING SAME

TECHNICAL FIELD

The present invention relates to a method for producing a laminate in which a reinforcing material such as a resin impregnated fiber reinforced tape is laminated on a metal member, and a laminate obtained by the method.

BACKGROUND ART

A thermoplastic resin impregnated fiber reinforced molded article in which a reinforcing fiber is combined with a thermoplastic resin is used in a wide range of fields such as pipes, pressure vessels, automobiles, aircrafts, electric and electronic devices, toys and home appliances since the molded article is excellent in mechanical properties and dimensional stability. A carbon fiber, which is a type of reinforcing fiber, has recently attracted attention because of its light weight, high strength and high rigidity.

On the other hand, polyolefin-based resins, which are hydrocarbon resins, have attracted attention as a matrix resin for resins reinforced by fiber since the polyolefin resins generally are inexpensive, excellent in processability and chemical resistance, are hard to generate a harmful gas even when incinerated, and have excellent characteristics such as excellent recyclability. Among them, polypropylene resins that are inexpensive, have a low specific gravity, have relatively high heat resistance, and have excellent properties such as moldability and chemical resistance are attracting attention. However, since polyolefin-based resins have low polarity, they have poor interfacial adhesion to reinforcing fibers. Therefore, attempts have been made to improve the interfacial adhesion between the fiber and the matrix resin by surface treatment of the reinforcing fiber and application of a sizing agent.

Patent Document 1 describes a fiber treatment agent using a polypropyl-ene-based resin modified with an unsaturated dicarboxylic acid or a salt thereof. Patent Document 2 describes that an acid-modified polypropylene resin having a specific acid value is provided as a sizing agent suitable for a polypropylene resin.

Patent Document 3 describes a carbon fiber containing an ionomer resin. Patent Document 4 describes a carbon fiber containing two acid-modified polypropylene-based resins. These are intended to improve the interfacial adhesion between a carbon fiber and a matrix resin by using a resin having affinity to both a carbon fiber and a polyolefin resin.

There are few examples of using a resin composition containing such a carbon fiber for tape winding molding or tape placement molding. The tape winding molding method can be applied also to a molded article having a relatively complicated shape, thus is a method which is suitably used for forming an external reinforcing layer such as a pipe or a pressure vessel (see, e.g., Patent Document 5).

The tape placement molding is a method of precisely laminating narrow tapes with computer-controlled positions and directions on surfaces of a complex shape using compaction rollers, and is a method capable of laminating a more complex shape (see, e.g., Patent Document 6).

In particular, a molding method using a laser fusion method can be mentioned as a tape winding molding method or a tape placement molding method with a high degree of freedom in shape.

CITATION LIST

Patent-Literature

Patent Document 1: JP 6-107442
Patent Document 2: JP 2005-48343
Patent Document 3: JP 2006-124852
Patent Document 4: WO2006/101269
Patent Document 5: JP 9-257193
Patent Document 6: U.S. Pat. No. 6,451,152

SUMMARY OF INVENTION

Technical Problem

The present inventors attempted tape placement molding or tape winding molding using a laser fusion method for metal members, and it was found that the peel strength and surface properties of the fusion bonding surface of the tape were not sufficient. That is, peeling of the fusion bonding surface tends to occur easily, and the surface smoothness may be deteriorated.

The present inventors estimated that such a phenomenon may be due to the following causes. That is, it was thought that the laser light was reflected on the metal surface and the temperature of the metal did not rise, while the heat generation in the vicinity of reinforcing fibers such as carbon fibers which absorb the energy of the laser and easily generates heat was too high, thus, a polyolefin as a matrix resin could be degraded locally, leading to surface roughness. Also, it was considered that the abnormal heat generation squeezed out the resin from the fibers, and the surface condition might be extremely deteriorated. In addition, it was also considered that the resin in the vicinity of the carbon fiber was melted and shrunk to generate a cavity, and peeling around the carbon fiber was likely to occur.

That is, the present inventors thought that it may be a cause of the phenomenon that the homogeneity as the composition containing a resin and a fiber is significantly reduced.

The present invention has been made to solve such problems. That is, an object of the present invention is to provide a method for producing a laminate in which a resin impregnated fiber reinforced composition layer is laminated on a metal member in which the interfacial peel strength and surface properties are improved, and a laminate obtained by the method.

Solution to Problem

As a result of earnestly examining this invention so as to achieve the object, the present inventors have discovered that it was very effective to laminate a resin impregnated fiber reinforced composition layer on a metal member via a resin coating, and completed the present invention. That is, the present invention has the following configurations.

[1] A method for producing a laminate including a step of laminating a resin impregnated fiber reinforced composition layer on a metal member, wherein the method includes
a step of forming a resin coating on the metal member; and
a step of laminating a resin impregnated fiber reinforced composition layer containing a resin impregnated fiber reinforced composition containing
(I) 20 to 80% by mass of a polymer having a melting point and/or a glass transition temperature of 50 to 300° C., and (C) 20 to 80% by mass of a reinforcing fiber (provided that the sum of the component (I) and the component (C) is taken as 100% by mass)

via the above resin coating.

[2] The method for producing a laminate according to [1], wherein the resin impregnated fiber reinforced composition further contains 0.01 to 5% by mass of a dye (II) which absorbs light having a wavelength of 300 to 3000 nm (provided that the sum of the component (I) and the component (C) is taken as 100% by mass).

[3] The method for producing a laminate according to [1], wherein the component (I) contains a carboxylic acid group, and the content rate of structural units containing the carboxylic acid group is 0.010 to 0.045% by mass (provided that the sum of the component (I) and the component (C) is taken as 100% by mass).

[4] The method for producing a laminate according to [1], wherein the resin coating has a layer not containing conductive particles.

[5] The method for producing a laminate according to [1], wherein the resin impregnated fiber reinforced composition layer is laminated by a laser fusion method.

[6] The method for producing a laminate according to [1], wherein the resin impregnated fiber reinforced composition layer is partially laminated to the metal member via the resin coating.

[7] The method for producing a laminate according to [6], wherein a ratio (Xm/Xf) in the surfaces of the metal member is 5/1 to 50/1, which is the ratio of the total area (Xm) of the surface of the metal member on the side on which the resin impregnated fiber reinforced composition layer is to be partially laminated and the area (Xf) of a part on which the resin impregnated fiber reinforced composition layer is to be partially laminated.

[8] The method for producing a laminate according to [6], wherein a maximum width in the surfaces of the metal member is 30 to 10000 mm, which is the maximum width of the surface of the metal member on the side on which the resin impregnated fiber reinforced composition layer is to be partially laminated, and a ratio (Wf/Wm) is 0.01 to 0.5, which is the ratio of the width (Wf) of the resin impregnated fiber reinforced composition layer and the width (Wm) of the surface of the metal member.

[9] The method for producing a laminate according to [1], wherein the metal member is a container substrate having a curved shape.

[10] The method for producing a laminate according to [9], wherein the resin impregnated fiber reinforced composition layer is formed by hoop winding and/or helical winding.

[11] The method for producing a laminate according to [1], wherein the metal member is a metal rotor body.

[12] The method for producing a laminate according to [11], wherein the resin impregnated fiber reinforced composition layer is laminated at least on the outer surface of the rotation peripheral part of the metal rotor body.

[13] A laminate having
a metal member,
a resin coating located on the surface of the metal member and
a resin impregnated fiber reinforced composition layer containing a resin impregnated fiber reinforced composition containing (I) 20 to 80% by mass of a polymer having a melting point and/or a glass transition temperature of 50 to 250° C., and (C) 20 to 80% by mass of a reinforcing fiber (provided that the sum of the component (I) and the component (C) is taken as 100% by mass).

[14] The laminate according to [13], wherein the resin impregnated fiber reinforced composition further contains 0.01 to 5% by mass of a dye (II) which absorbs light having a wavelength of 300 to 3000 nm (provided that the sum of the component (I) and the component (C) is taken as 100% by mass).

[15] The laminate according to [13], wherein the component (I) contains a carboxylic acid group, and the content rate of structural units containing the carboxylic acid group is 0.010 to 0.045% by mass (provided that the sum of the component (I) and the component (C) is taken as 100% by mass).

[16] The laminate according to [13], wherein the resin coating has a layer not containing conductive particles.

[17] The laminate according to [13], wherein the resin impregnated fiber reinforced composition is a resin impregnated fiber reinforced composition for tape winding molding.

[18] The laminate according to [13], wherein the resin impregnated fiber reinforced composition layer is a layer partially laminated to the metal member via the resin coating.

[19] The laminate according to [13], wherein the metal member is a container substrate having a curved shape.

[20] The laminate according to [13], wherein the metal member is a metal rotor body.

Advantageous Effects of Invention

According to the present invention, since the resin impregnated fiber reinforced composition layer is laminated on a metal member via a resin coating, the interfacial peel strength and surface properties are improved. Furthermore, in an embodiment in which the resin impregnated fiber reinforced composition contains a specific dye, deterioration or deformation of the matrix resin is suppressed also in tape winding molding or tape placement molding using a laser fusion method, and as a result, it is possible to provide a laminate having an excellent peel strength of the fused surface and excellent surface properties thereof. Therefore, the contribution to the industrial development of the present invention is great.

MODES FOR CARRYING OUT THE INVENTION

<Resin Impregnated Fiber Reinforced Composition>

Figure 1A:
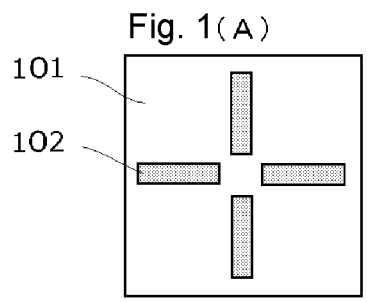
FIGS. 1 (A) to 1(J) are schematic plan views showing an example of a laminate of the embodiment (1) of the present invention.
Figure 1B:
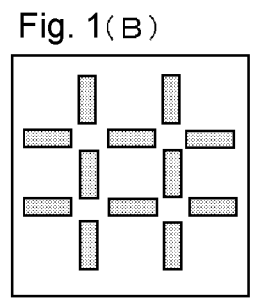
Figure 1C:
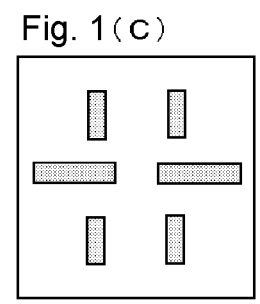
Figure 1D:
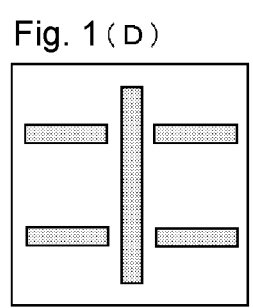
Figure 1E:
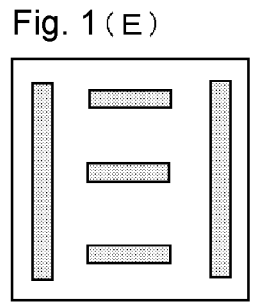
Figure 1F:
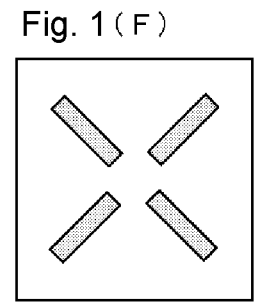
Figure 1G:
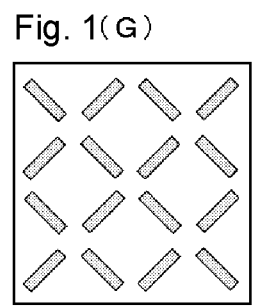
Figure 1H:
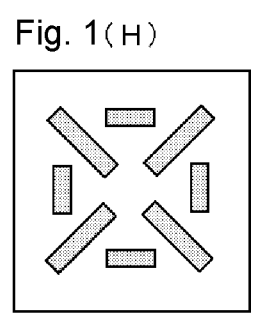
Figure 1I:
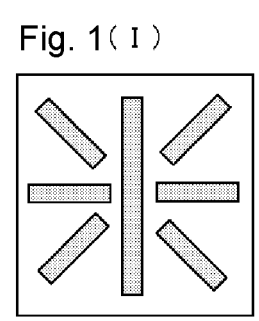
Figure 1J:
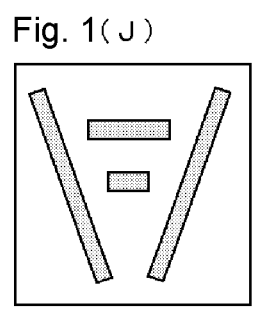

The resin impregnated fiber reinforced composition used in the present invention comprises a reinforcing fiber (C), a polymer (I) having a melting point and/or a glass transition temperature of 50 to 300° C., and, if necessary, a dye (II). More specific preferred examples include a reinforcing fiber bundle as described below, a matrix resin (example of polymer (I)), and, if necessary, a dye (II). The polymer (I) means all the polymers contained in a resin impregnated fiber reinforced composition, and includes not only matrix resins but also resin components such as the propylene-based resin (A) and the propylene-based resin (B) used as a sizing agent in a reinforcing fiber. The polymer (I) is preferably an olefin-based polymer containing an olefin-derived structural unit having 2 to 20 carbon atoms, more preferably a propylene-based polymer, and the details of which will be described later.

As the reinforcing fibers (C), for example, high strength and high modulus fibers such as carbon fibers, glass fibers, aramid fibers, alumina fibers, silicon carbide fibers, boron fibers and metal fibers can be used. These may be used singly or in combination of two or more. Among them, carbon fibers are preferable. As the carbon fiber, PAN-based, pitch-based or rayon-based carbon fibers are preferable in terms of improvement of mechanical properties and weight reduction. Furthermore, PAN-based carbon fibers are particularly preferable in terms of the balance between the strength and elastic modulus of the resulting molded article. In addition, reinforcing fibers (C) endowed with conductivity, for example, reinforcing fibers (C) containing a metal such as nickel, copper and ytterbium can also be used. The metal is preferably contained in such a form as to coat the reinforcing fiber (C).

In the carbon fiber, the surface oxygen concentration ratio [O/C], which is the ratio of the number of oxygen (O) atoms to the number of carbon (C) atoms on the fiber surface measured by X-ray photoelectron spectroscopy, is preferably 0.05 to 0.5, more preferably 0.08 to 0.4, particularly preferably 0.1 to 0.3. When the surface oxygen concentration ratio is 0.05 or more, the amount of functional groups on the surface of the carbon fiber can be secured, and firmer adhesion with the resin can be obtained. Although the upper limit of the surface oxygen concentration ratio is not particularly limited, it is generally preferable that the upper limit be 0.5 or less in view of the balance between the handleability and the productivity of the carbon fiber.

The surface oxygen concentration ratio [O/C] of the carbon fiber can be determined by X-ray photoelectron spectroscopy according to the following procedure. First, a carbon fiber bundle from which a sizing agent adhering to the surface of a carbon fiber is removed by a solvent is cut into 20 mm. This is spread and arranged on a copper sample support, and AlKα1,2 is used as an X-ray source, and the sample chamber is maintained at $1 \times 10^8$ Torr. The kinetic energy value (K.E.) of the main peak of $C_{1s}$ is adjusted to 1202 eV as a correction value of the peak associated with charging during measurement. Then, a $C_{1s}$ peak area is determined by drawing a straight base line in the range of 1191 to 1205 eV as K.E. Also, an $O_{1s}$ peak area is determined by drawing a straight base line in the range of 947 to 959 eV as K.E. The surface oxygen concentration ratio [O/C] is calculated as the atomic ratio, using the ratio of the $O_{1s}$ peak area to the $C_{1s}$ peak area and the sensitivity correction value unique to the device. As the X-ray photoelectron spectrometer, a model ES-200 manufactured by Kokusai electric Inc. is used, and the sensitivity correction value is set to 1.74.

The method of controlling the surface oxygen concentration ratio [O/C] to 0.05 to 0.5 is not particularly limited. For example, it can be controlled by methods, such as an electrolytic oxidation treatment, a chemical solution oxidation treatment and a gaseous-phase oxidation treatment. Among them, an electrolytic oxidation treatment is preferable.

The average fiber diameter of the reinforcing fiber (C) is not particularly limited, but is preferably 1 to 20 μm, more preferably 3 to 15 μm, in terms of mechanical properties and surface appearance of the resulting molded article. Although the number of single yarns of the reinforcing fiber bundle is not particularly limited, it is usually 100 to 350,000, preferably 1,000 to 250,000, more preferably 5,000 to 220,000. Furthermore, in the present invention, since a propylene-based resin (A) and a propylene-based resin (B) described later are used, it is also expected to exhibit an excellent effect even for a fiber bundle (large tow) having 40,000 or more fibers.

The reinforcing fiber (C) is preferably sized with a resin containing a specific component and used as a reinforcing fiber bundle. The resin used for the sizing treatment is a polyolefin containing an olefin unit having 2 to 20 carbon atoms, and preferably contains a propylene-based resin (A) having a structural unit derived from propylene in a proportion of preferably 50 mol % or more and a propylene-based resin (B) containing at least a carboxylic acid salt bonded to a polymer chain.

The propylene-based resin (A) preferably contains a component (A-1) having a weight-average molecular weight exceeding 50,000 (hereinafter also referred to as "propylene-based resin component (A-1)") and a component (A-2) having a weight-average molecular weight of 100,000 or less (hereinafter also referred to as "propylene-based resin component (A-2)")(molecular weight of component (A-1) >molecular weight of component (A-2)). The weight-average molecular weight range of the propylene-based resin component (A-1) is preferably 70,000 or more, more preferably 100,000 or more. The upper limit of the weight-average molecular weight of the propylene-based resin component (A-1) is not particularly limited, but is preferably 700,000, more preferably 500,000, particularly preferably 450,000, most preferably 400,000 from the viewpoint of melt flowability at the time of molding and the appearance of a molded article. On the other hand, the range of the weight-average molecular weight of the propylene-based resin component (A-2) is preferably 50,000 or less, more preferably 40,000 or less. The lower limit value of the weight-average molecular weight of the propylene-based resin component (A-2) is preferably 10,000, more preferably 15,000, particularly preferably 20,000, most preferably 25,000 from the viewpoint of the strength of the reinforcing fiber bundle and the handleability (sticking).

The propylene-based resin (A) preferably contains over 60% by mass and 100% by mass or less of the component (A-1) and 0% by mass or more and less than 40% by mass of the component (A-2), more preferably contains 70 to 100% by mass of the component (A-1) and 0 to 30% by mass of the component (A-2), particularly preferably 73 to 100% by mass of the component (A-1) and 0 to 27% by mass of the component (A-2) (provided that the sum of the component (A-1) and the component (A-2) is taken as 100% by mass).

The difference between the weight-average molecular weight of the propylene-based resin component (A-1) and the weight-average molecular weight of the propylene-based resin component (A-2) is preferably 20,000 to 300,000, more preferably 30,000 to 200,000 and particularly preferably 35,000 to 200,000.

Since the propylene-based resin (A) contains a relatively large amount of the propylene-based resin component (A-1) having a high weight-average molecular weight, even if the amount of the propylene-based resin (A) used for the reinforcing fiber bundle is relatively small, it is less likely to cause the problem of fuzz, the problem of shape change such as collapse, peeling or breakage due to factors such as impact, and the problem of generation of a fine powder resulting therefrom.

The propylene-based resin (A) is a resin having a structural unit derived from propylene, and is usually a polymer of propylene. In particular, it is a copolymer containing a structural unit derived from at least one olefin (excepting propylene) or polyene selected from α-olefins, conjugated dienes and non-conjugated dienes, together with a structural unit derived from propylene.

Specific examples of the α-olefin include α-olefins having 2 to 20 carbon atoms excluding propylene such as ethylene, 1-butene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, 1-dodecene, 1-tetradecene, 1-hexadecene, 1-octadecene and 1-eicosene. Among these, 1-butene, ethylene, 4-methyl-1-pentene and 1-hexene are preferable, and 1-butene and 4-methyl-1-pentene are particularly preferable.

Specific examples of the conjugated diene and the non-conjugated diene include butadiene, ethylidene norbornene, dicyclopentadiene and 1,5-hexadiene.

The above α-olefins, conjugated dienes and nonconjugated dienes may be used in combination of two or more.

The propylene-based resin (A) is preferably a random or block copolymer of propylene and the above-mentioned olefin or polyene compound. As long as the object of the present invention is not impaired, other olefin-based polymers can also be used together with the propylene-based resin (A). As another olefin-based polymer, for example, an ethylene-propylene copolymer, an ethylene-1-butene copolymer and an ethylene-propylene-1-butene copolymer are preferable.

The proportion of structural units derived from propylene of the propylene-based resin (A) is preferably 50 to 100 mol %, more preferably 50 to 99 mol %, particularly preferably 55 to 98 mol %, most preferably 60 to 97 mol %, from the viewpoint of enhancing the affinity to the propylene-based resin (B) and the matrix resin described later.

For identification of the monomer repeating unit in the propylene-based resin (A), a $^{13}C$-NMR method is generally used. Mass spectrometry and elemental analysis may also be used. In addition, it is also possible to use a method of determining the composition by conducting IR analysis of plural kinds of copolymers having different compositions determined by an NMR method, and preparing a calibration curve from information such as absorption of specific wave number and thickness of a specimen. The IR method is preferably used, for example, for process analysis.

The propylene-based resin (A) preferably has a Shore A hardness of 60 to 90, or a Shore D hardness of 45 to 65. The Shore A hardness is more preferably 65 to 88, and particularly preferably 70 to 85. The Shore D hardness is more preferably 48 to 63, and particularly preferably 50 to 60. If the Shore A hardness or Shore D hardness of the propylene-based resin (A) is within these ranges, the ability to follow the reinforcing fiber (C) is good, partial cracking is unlikely to occur, and a reinforcing fiber bundle with a stable shape is achieved easily, and additionally, there is also an advantageous tendency to increase the strength of the composition in combination with the matrix resin described later. It is speculated that this is because the propylene-based resin (A) and the matrix resin have a good molecular chain entanglement structure.

The propylene-based resin (A) may be modified with a compound containing a carboxylic acid group or a carboxylic acid ester group, or may be a non-modified product. When the propylene-based resin (A) is a modified product, the modified amount is preferably less than 2.0 mmol equivalents, more preferably 1.0 mmol equivalent or less, particularly preferably 0.5 mmol equivalents or less, in terms of the group represented by —C(=O)—O—. When the propylene-based resin (A) is a modified product, it is preferable that the propylene-based resin component (A-2) is a modified product.

On the other hand, it may be preferable that the propylene-based resin (A) is substantially unmodified depending on the application to be used. Here, substantially unmodified means desirably not being modified at all, but even if modified, the modified amount is preferably less than 0.05 mmol equivalents, more preferably 0.01 mmol equivalent or less, particularly preferably 0.001 mmol equivalent or less, most preferably 0.0001 mmol equivalent or less in terms of the group represented by —C(=O)—O—.

The melting point or glass transition temperature of the propylene-based resin (A) is 0 to 165° C. In some cases, a resin that does not exhibit a melting point is used.

The propylene-based resin (B) is a propylene-based resin containing at least a carboxylic acid salt bonded to a polymer chain. This carboxylic acid salt is effective in enhancing the interaction with the reinforcing fiber (C).

Among the raw materials of the propylene-based resin (B), the propylene-based polymer includes, for example, a propylene homopolymer; copolymers of propylene and an α-olefin alone or two or more types of α-olefins typified by an ethylene-propylene copolymer, a propylene-1-butene copolymer and an ethylene-propylene-1-butene copolymer. Among the raw materials, the monomer having a carboxylic acid structure includes, for example, a monomer having a neutralized or non-neutralized carboxylic acid group, and a monomer having a saponified or non-saponified carboxylic acid ester. Radical graft polymerization of such a propylene-based polymer and a monomer having a carboxylic acid structure is a typical method for producing the propylene-based resin (B). Specific examples of the olefin used for the propylene-based polymer are the same as the olefins used for the propylene-based resin (A).

By using a special catalyst, it is possible to directly polymerize propylene and a monomer having a carboxylic acid ester to obtain a propylene-based resin (B), or in the case of a polymer containing a large amount of ethylene, there is also a possibility that a propylene-based resin (B) can be obtained by high pressure radical polymerization of ethylene and propylene and a monomer having a carboxylic acid structure.

The monomer having a neutralized or non-neutralized carboxylic acid group and the monomer having a saponified or non-saponified carboxylic acid ester group include, for example, ethylenically unsaturated carboxylic acids, their anhydrides, their esters, and compounds having an unsaturated vinyl group other than olefins.

Specific examples of the ethylenically unsaturated carboxylic acid include (meth)acrylic acid, maleic acid, fumaric acid, tetrahydrophthalic acid, itaconic acid, citraconic acid, crotonic acid and isocrotonic acid. Specific examples of the anhydride include Nadic Acid™ (endocis-bicyclo[2.2.1]hept-5-ene-2,3-dicarboxylic acid), maleic anhydride and citraconic anhydride.

Specific examples of the monomer having an unsaturated vinyl group other than olefins include (meth)acrylic acid esters such as methyl (meth)acrylate, ethyl (meth)acrylate, propyl (meth)acrylate, n-butyl (meth)acrylate, i-butyl (meth)acrylate, tert-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, stearyl (meth)acrylate, tridecyl (meth)acrylate, lauroyl (meth)acrylate, cyclohexyl (meth)acrylate, benzyl (meth)acrylate, phenyl (meth)acrylate, isobornyl (meth)acrylate, dicyclopentanyl (meth)acrylate, dicyclopentenyl (meth)acrylate, dimethylaminoethyl (meth)acrylate and diethylaminoethyl (meth)acrylate; hydroxyl group-containing vinyls such as hydroxyethyl acrylate, 2-hydroxyethyl (meth)acrylate, 2-hydroxypropyl (meth)acrylate, 4-hydroxybutyl acrylate, lactone-modified hydroxyethyl (meth)acrylate and 2-hydroxy-3-phenoxypropyl acrylate; epoxy group-containing vinyls such as glycidyl (meth)acrylate and methyl glycidyl (meth)acrylate; isocyanate group-containing vinyls such as vinyl isocyanate and isopropenyl isocyanate; aromatic vinyls such as styrene, α-methylstyrene, vinyltoluene and t-butylstyrene; amides such as acrylamide, methacrylamide, N-methylol methacrylamide, N-methylol acrylamide, diacetone acrylamide and maleic acid amide; vinyl esters such as vinyl acetate and vinyl propionate; aminoalkyl (meth)acrylates such as N,N-dimethylaminoethyl (meth)acrylate, N,N-diethylaminoethyl (meth)acrylate, N,N-dimethylaminopropyl (meth)acrylate, N,N-dipropylaminoethyl (meth)acrylate, N,N-dibutylaminoethyl (meth)acrylate and N,N-dihydroxyethylaminoethyl (meth)acrylate; unsaturated sulfonic acids such as styrene sulfonic acid, sodium styrene sulfonate and 2-acrylamido-2-methylpropane sulfonic acid; and unsaturated phosphoric acids such as mono (2-methacryloyloxyethyl) acid phosphate and mono (2-acryloyloxyethyl) acid phosphate.

The above monomers may be used in combination of two or more. Among them, acid anhydrides are preferable, and maleic anhydride is more preferable.

The propylene-based resin (B) can be obtained by various methods as described above. More specifically, there are mentioned, for example, a method of reacting a propylene-based polymer and an ethylenically unsaturated carboxylic acid having an unsaturated vinyl group or a monomer having an unsaturated vinyl group other than an olefin in an organic solvent in the presence of a polymerization initiator, and then removing the solvent, a method of reacting a carboxylic acid having an unsaturated vinyl group and a polymerization initiator under stirring with a melt obtained by heating and melting a propylene-based polymer, and a method of supplying a mixture of a propylene-based polymer, a carboxylic acid having an unsaturated vinyl group and a polymerization initiator to an extruder and reacting while heating and kneading, and then converting it into a carboxylic acid salt by a method such as neutralization or saponification.

Specific examples of the polymerization initiator include various peroxide compounds such as benzoyl peroxide, dichlorobenzoyl peroxide, dicumyl peroxide, di-tert-butyl peroxide, 2,5-dimethyl-2,5-di(peroxybenzoate)hexin-3 and 1,4-bis (tert-butylperoxyisopropyl) benzene. Also, azo compounds such as azobisisobutyronitrile may be used. The polymerization initiators may be used in combination of two or more.

Specific examples of the organic solvent include aromatic hydrocarbons such as xylene, toluene and ethylbenzene; aliphatic hydrocarbons such as hexane, heptane, octane, decane, isooctane and isodecane; alicyclic hydrocarbons such as cyclohexane, cyclohexene, methylcyclohexane and ethylcyclohexane; ester solvents such as ethyl acetate, n-butyl acetate, cellosolve acetate, propylene glycol monomethyl ether acetate, propylene glycol monoethyl ether acetate and 3-methoxybutyl acetate; and ketones such as methyl ethyl ketone and methyl isobutyl ketone. A mixture of two or more organic solvents may be used. Among them, aromatic hydrocarbons, aliphatic hydrocarbons and alicyclic hydrocarbons are preferable, and aliphatic hydrocarbons and alicyclic hydrocarbons are more preferable.

The method of obtaining a propylene-based resin (B) through the neutralization or saponification step is a practically preferable method because it becomes easy to treat the raw materials of the propylene-based resin (B) in the form of an aqueous dispersion.

Specific examples of the basic substance used for neutralization or saponification of the aqueous dispersion include alkali metals or alkaline earth metals such as sodium, potassium, lithium, calcium, magnesium and zinc or other metals; inorganic amines such as hydroxylamine and ammonium hydroxide; organic amines such as ammonia, (tri)methylamine, (tri)ethanolamine, (tri)ethylamine, dimethylethanolamine and morpholine; oxides, hydroxides and hydrides of alkali metals or alkaline earth metals or other metals such as sodium oxide and sodium peroxide; and weak acid salts of alkali metals or alkaline earth metals or other metals such as sodium carbonate. As the carboxylic acid salt or carboxylic acid ester group neutralized or saponified by the basic substance, carboxylic acid alkali metal salts such as sodium carboxylate and potassium carboxylate; and ammonium carboxylates are suitable.

The degree of neutralization or degree of saponification, that is, the conversion rate of a carboxylic acid group of the raw material of the propylene-based resin (B) to a carboxylic acid salt such as metal salts and ammonium salts is usually 50 to 100%, preferably 70 to 100%, more preferably 85 to 100%, from the viewpoint of the stability of the aqueous dispersion and the adhesion to the fiber. The carboxylic acid groups in the propylene-based resin (B) are preferably all neutralized or saponified by the base substance, but some of the carboxylic acid groups may remain without being neutralized or saponified.

As a method of analyzing a salt component of a carboxylic acid group, there are, for example, a method of detecting a metal species forming a salt by ICP emission analysis and a method of identifying the structure of a salt of an acid group using IR, NMR, mass spectrometry or elemental analysis.

As a method of calculating the conversion rate of a carboxylic acid group to a neutralized salt, there is, for example, a method in which a propylene-based resin (B) is dissolved in heated toluene and titrated with a 0.1 N potassium hydroxide-ethanol standard solution, and the acid value of the propylene-based resin (B) is determined from the following formula, and the conversion rate is calculated as compared to the total number of moles of the original carboxylic acid group.

Acid value=$(5.611 \times A \times F)B$ (mg KOH/g)

A: Use amount of 0.1N potassium hydroxide-ethanol standard solution (ml)

F: Factor of 0.1N potassium hydroxide-ethanol standard solution

B: Sampling amount (g)

Next, the acid value calculated by the above method is converted into the number of moles of the non-neutralized carboxylic acid group using the following formula.

Number of moles of non-neutralized carboxylic acid group=acid number×1000/56 (mole/g)

Then, using the total number of moles (mole/g) of the carboxylic acid group calculated separately by performing quantification of the carbonyl carbon of the carboxylic acid group using IR, NMR and elemental analysis, the conversion rate of the carboxylic acid group to a neutralized salt is calculated by the following formula % Conversion rate=$(1-r) \times 100$(%)

r: number of moles of non-neutralized carboxylic acid group/total number of moles of carboxylic acid group From the viewpoint of enhancing the interaction with the reinforcing fiber (C), the content rate of the carboxylic acid salt bonded to the polymer chain of the propylene-based resin (B) is preferably 0.05 to 5 mmol equivalents in total amount in terms of the group represented by —C(=O)—O— per 1 g of the propylene-based resin (B). More preferably, it is 0.1 to 4 mmol equivalents, particularly preferably 0.3 to 3 mmol equivalents. As a method of analyzing the content rate of the carboxylic acid salt as described above, there are a method of quantitatively detecting a metal species forming a salt by ICP emission analysis and a method of quantifying the carbonyl carbon of a carboxylic acid salt using IR, NMR or elemental analysis. The more specific measuring method of the content rate of the carboxylic acid skeleton can illustrate the following method. The content rate of the carboxylic acid skeleton of the sample can be specified by a $^{13}$C-NMR method in a conventional manner under high temperature solution conditions of 100 MHz or more and 120° C. or more. In addition, there is also known a method in which after a plurality of samples having different content rates of carbonyl skeleton are measured by the $^{13}$C-NMR to specify the content rate of the carboxylic acid skeleton, IR measurement of the same sample is performed, a calibration curve of the ratio of characteristic absorption of, for example, carbonyl to the sample thickness or another typical absorption and the content rate of the carboxylic acid skeleton is prepared, and the introduction rate of the carboxylic acid skeleton is specified by IR measurement.

The content rate of the carboxylic acid group of the propylene-based resin (B) can also be evaluated by, for example, an acid value as another method. The range of the acid value of the propylene-based resin (B) is preferably 10 to 100 mg KOH/g, more preferably 20 to 80 mg KOH/g, particularly preferably 25 to 70 mg KOH/g, most preferably 25 to 65 mg KOH/g.

In the present invention, the weight-average molecular weight of the propylene-based resin (A) is preferably higher than the weight-average molecular weight of the propylene-based resin (B). Thereby, it is expected that the propylene-based resin (B) is easily moved during molding, and the interaction between the reinforcing fiber (C) and the propylene-based resin (B) is strengthened. In this case, the difference between the weight-average molecular weight of the propylene-based resin (A) and the weight-average molecular weight of the propylene-based resin (B) is preferably 10,000 to 380,000, more preferably 120,000 to 380,000, particularly preferably 130,000 to 380,000.

The weight-average molecular weight of the propylene-based resin (B) is preferably from 1,000 to 100,000, more preferably from 2,000 to 80,000, particularly preferably from 5,000 to 50,000, most preferably from 5,000 to 30,000, from the viewpoint of the above interaction and compatibility with the propylene-based resin (A), preferably compatibility with the propylene-based resin (A-2).

The weight-average molecular weight in the present invention is determined by gel permeation chromatography (GPC).

The melt flow rate (ASTM 1238 standard, 230° C., 2.16 kg load) of the propylene-based resin (B) is preferably 3 to 500 g/10 min. The lower limit is more preferably 5 g/10 min, particularly preferably 7 g/10 min. The upper limit is more preferably 400 g/10 min, particularly preferably 350 g/10 min.

The preferred melt flow rate range of the measured value under ASTM 1238 standard, 190° C., 2.16 kg load may be the same value range as described above.

Regarding the proportion of the propylene-based resin (A) and the propylene-based resin (B) in the reinforcing fiber bundle, the proportion of the propylene-based resin (B) is 3 to 50 parts by mass, preferably 3 to 45 parts by mass, more preferably 5 to 45 parts by mass, and particularly preferably 7 to 40 parts by mass per 100 parts by mass of the propylene-based resin (A). Within this range, it becomes possible to make the characteristics related to the strength and the shape derived from the propylene-based resin (A) and the affinity with the reinforcing fiber (C) compatible at a high level. If the amount of the propylene-based resin (B) is less than 3 parts by mass, the affinity to the reinforcing fiber (C) may be reduced, and the adhesive properties may be inferior. When the content of the propylene-based resin (B) is more than 50 parts by mass, the strength of the mixture itself may decrease or fuzz may increase, so that strong adhesive properties may not be maintained.

If the molecular weights and content rates of the propylene-based resins (A) and (B) used in the reinforcing fiber bundle are within the ranges described above, it is expected that the propylene-based resins (A) and (B) effectively interact with the reinforcing fiber (C) and the matrix resin, the compatibility becomes relatively high, and the adhesiveness is improved.

In the reinforcing fiber bundle, in addition to the propylene-based resin (A) and the propylene-based resin (B), other components may be used in combination as long as the effects of the present invention are not impaired. For example, in the case of applying a propylene-based resin in the form of an emulsion to the reinforcing fiber bundle, a surfactant for stabilizing the emulsion may be added. The content rate of such other components is preferably 10% by mass or less, more preferably 5% by mass or less, particularly preferably 2% by mass or less, with respect to 100% by mass of the sum of the propylene-based resin (A) and the propylene-based resin (B).

It is also preferable that the total content rate of the propylene-based resin (A) and the propylene-based resin (B) is 0.3 to 5% by mass in 100% by mass of the whole reinforcing fiber bundle. If the total content rate of the propylene-based resin (A) and the propylene-based resin (B) is less than 0.3% by mass, a large number of exposed portions of reinforcing fibers may be present, and the strength of the resulting product may decrease and the handleability of the reinforcing fiber bundle may be insufficient. The handleability referred to here is, for example, the hardness and the easiness of spread of a fiber bundle when winding the fiber bundle on a bobbin. In addition, when the fiber bundle is cut and used as a chopped fiber bundle, the handleability refers to the focusability of the chopped fiber bundle. On the other hand, if the content rate exceeds 5% by mass, mechanical properties of the molded article may be extremely reduced, or the fiber bundle may be extremely hard, which may cause problems such as non-winding on a bobbin. The lower limit value of the content rate is preferably 0.4% by mass from the viewpoint of the balance between the adhesiveness and the handleability of the reinforcing fiber bundle. On the other hand, the upper limit value is preferably 4% by mass, more preferably 3% by mass.

Regarding the method of making a mixture of a propylene-based resin (A) and a propylene-based resin (B) adhere to a reinforcing fiber (C), there are, for example, a method in which the above mixture is melted as it is or in combination with a heat stabilizer and brought into contact with the reinforcing fiber (C) and a method in which the above mixture is brought into contact with the reinforcing fiber (C) in the form of emulsion or suspension. After the contacting step, a heat treatment may be performed.

It is preferable to apply an emulsion of a mixture of a propylene-based resin (A) and a propylene-based resin (B) to a reinforcing fiber (C) and to dry it, from the viewpoint that it is easy to adhere uniformly between single fibers. As the method of applying an emulsion to a reinforcing fiber (C), known methods, such as a roller immersion method, a roller transfer method and a spray method, can be used.

The emulsion can be produced by known methods. The specific production method is described, for example, in WO 2007/125924 pamphlet, WO 2008/096682 pamphlet and JP 2008-144146.

As a method of specifying the easiness of loosening of the fiber bundle due to the cause such as fuzz described above, for example, a method described in JP 5584977 and an evaluation method of focusability described in JP 2015-165055 are known. In the example of the present specification, the former is used for evaluation. Specifically, the latter method is as follows.

The reinforcing fiber bundle is cut into about 5 mm short fibers using stainless steel scissors. The obtained short fibers are evaluated by the following visual judgment.

A: The short fiber is in almost the same state as before cutting.

X: The short fiber is largely loosened or a crack has occurred.

In the single fiber forming the reinforcing fiber bundle, preferably 60% or more, more preferably 70% or more and particularly preferably 80% or more of the surface of the single fiber is coated with a mixture containing a propylene-based resin (A) and a propylene-based resin (B) in order to exert stronger adhesion. The part which is not coated cannot exhibit adhesiveness, and becomes a starting point of peeling, and it may lower the overall adhesiveness. The coated state can be evaluated, for example, by a method of tracing the metal element of a carboxylic acid salt by scanning electron microscopy (SEM) or elemental analysis of the fiber surface.

The matrix resin used in the present invention is preferably a polyolefin-based resin from the viewpoint of low polarity, more preferably an ethylene-based polymer or a propylene-based polymer from the viewpoint of cost and weight reduction of molded articles, particularly preferably a propylene-based resin (D).

The propylene-based resin (D) may be an unmodified propylene-based resin, or may contain a propylene-based resin having a carboxylic acid structure or a carboxylic acid salt structure by a method such as modification. Preferably, it is an embodiment containing the latter modified propylene-based resin. When using both a non-modified resin and a propylene-based resin having a carboxylic acid or carboxylic acid salt structure, the preferred weight ratio is 80/20 to 99/1, more preferably 89/11 to 99/1, particularly preferably 89/11 to 93/7, and most preferably 90/10 to 95/5 in a non-modified/modified ratio. The composition of the propylene-based resin (D) is a general propylene resin containing a structural unit derived from a monomer (such as an olefin or a carboxylic acid ester compound) described in the description of the propylene-based resin (A) and the propylene-based resin (B) in a preferred embodiment. For example, it is a propylene polymer called homopolypropylene, random polypropylene, block polypropylene or modified polypropylene.

The weight-average molecular weight Mw (D) of the propylene-based resin (D) preferably satisfies the following relationship with the weight-average molecular weight Mw (A) of the propylene-based resin (A) and the weight-average molecular weight Mw (B) of the propylene-based resin (B).

$$Mw(A) > Mw(D) > Mw(B)$$

The weight-average molecular weight of the propylene-based resin (D) is preferably 50,000 to 350,000, more preferably 100,000 to 330,000, and particularly preferably 150,000 to 320,000. The difference in molecular weight between the propylene-based resin (A) and the propylene-based resin (D) is preferably 10,000 to 400,000, more preferably 20,000 to 200,000, further preferably 20,000 to 100,000.

The resin impregnated fiber reinforced composition contains 25 to 75% by mass, preferably 30 to 68 parts by mass, more preferably 35 to 65 parts by mass of a reinforcing fiber bundle. On the other hand, the propylene-based resin (D) is contained in an amount of 75 to 25 parts by mass, preferably 70 to 32 parts by mass, and more preferably 65 to 35 parts by mass. However, it is a value when the sum of a reinforcing fiber bundle (component (A), component (B) and component (C)) and a propylene-based resin (D) is taken as 100 parts by mass.

The propylene-based resin (D) is preferably bonded to the periphery of a reinforcing fiber bundle containing the reinforcing fiber (C), the propylene-based resin (A) and the propylene-based resin (B).

The propylene-based resin (D) preferably contains an unmodified propylene-based resin and an acid-modified propylene-based resin. In particular, since a relatively large amount of modified propylene-based resin is contained, the structure between the reinforcing fiber and the resin tends to be difficult to change even by using the laser fusion method described later. It is presumed that this is because even if the modified olefin polymer (A-2) in the vicinity of the reinforcing fiber is destroyed, the modified resin component of the propylene-based resin (D) complements it.

The propylene-based resin (D) can be produced by a known method, and the stereoregularity of the resin (polymer) may be isotactic, syndiotactic or atactic. The stereoregularity is preferably isotactic or syndiotactic.

The specific method for producing the propylene-based resin (D) (in particular, unmodified resin) is described, for example, in WO 2004/087775 pamphlet, WO 2006/057361 pamphlet, WO 2006/123759 pamphlet, JP 2007-308667, WO 2005/103141 pamphlet, Japanese 4675629, WO 2014/050817 pamphlet and JP 2013-237861.

The mass ratio of the reinforcing fiber (C) to the polymer (I) (sum of the component (A), the component (B) and the component (D)) in the resin impregnated fiber reinforced composition is 80/20 to 20/80, preferably 75/25 to 30/70, more preferably 70/30 to 35/65, particularly preferably 65/35 to 40/60, most preferably 60/40 to 40/60 (provided that the sum of the component (I) and the component (C) is taken as 100). If the amount of the reinforcing fiber (C) is too large, tape peeling may occur easily in the tape winding molded article described later. On the other hand, when the amount of the polymer (I) is too large, the strength of the tape winding molded article described later may be reduced.

The melting point or glass transition temperature of the polymer (I) is 50 to 300° C. The lower limit value is preferably 70° C. or more, more preferably 80° C. or more. On the other hand, the upper limit value is preferably 280° C. or less, more preferably 270° C. or less, and particularly preferably 260° C. or less. The melting point is preferably in these temperature ranges, the melting point is more preferably 250° C. or less, and particularly preferably 240° C. or less.

The polymer (I) preferably contains a carboxylic acid group. The content rate of the structural unit containing a carboxylic acid group is 0.010 to 0.045% by mass, preferably 0.012 to 0.040% by mass, particularly preferably 0.015 to 0.035% by mass, provided that the sum of the reinforcing fiber (C) and the polymer (I) in the resin impregnated fiber reinforced composition is taken as 100% by mass. When the content rate of the structural unit containing a carboxylic acid group is too low, tape peeling may occur easily in the tape winding molded article described later. As the structural unit containing a carboxylic acid group, for example, a structural unit derived from a carboxylic acid group and a structural unit derived from a carboxylic acid salt contained in the propylene-based resin (A), the propylene-based resin (B) and the propylene-based resin (D) are mentioned.

In the case where the polymer (I) contains a carboxylic acid group, it is also possible to grasp its content rate by the acid value. The preferred acid value is 0.1 to 0.55 mg KOH/g, more preferably 0.12 to 0.45 mg KOH/g, and particularly preferably 0.13 to 0.40 mg KOH/g.

The melt flow rate (ASTM 1238 standard, 230° C., 2.16 kg load) of the polymer (I) is preferably 1 to 500 g/10 min, more preferably 3 to 300 g/10 min, particularly preferably 5 to 100 g/10 min. The weight-average molecular weight of the polymer (I) is preferably 50,000 to 400,000, more preferably 100,000 to 370,000, and particularly preferably 150,000 to 350,000.

In the present invention, it is also one of the preferred embodiments to use a reinforcing fiber bundle containing a butene-based resin, an olefin-based resin containing at least a carboxylic acid salt bonded to a polymer chain, and a reinforcing fiber (C).

In this embodiment, the melt flow rate (MFR) of the butene-based resin determined under the conditions of 190° C. and a 2.16 kg load in accordance with the ASTM 1238 standard is preferably 0.01 to 20 g/10 min. The lower limit value of MFR is more preferably 0.05 g/10 min, particularly preferably 0.07 g/10 min. The upper limit value is more preferably 15 g/10 minutes, particularly preferably 12 g/10 minutes, and most preferably 10 g/10 minutes. Moreover, it is preferable that MFR of the butene-based resin is smaller than MFR of the olefin-based resin. The weight-average molecular weight (Mw) of the butene-based resin measured by GPC is preferably more than 50,000 and less than 1,000,000. More preferably, the component having Mw exceeding 150,000 is more than 70% by mass and not more than 100% by mass, and more preferably the component having Mw exceeding 150,000 is 73 to 100% by mass. A large amount of components having a high molecular weight is considered to be preferable because the curing rate in the cooling process after melting is slow. Moreover, it is preferable that Mw of the butene-based resin is larger than Mw of the olefin-based resin. The difference between Mw of the butene-based resin and Mw of the olefin-based resin is preferably 10,000 to 380,000, more preferably 120,000 to 380,000, and particularly preferably 130,000 to 380,000.

In this embodiment, the content of the olefin-based resin is preferably 3 to 50 parts by mass, more preferably 5 to 45 parts by weight, particularly preferably 7 to 40 parts by weight with respect to 100 parts by mass of butene-based resin in the reinforcing fiber bundle. The total content rate of the butene-based resin and the olefin-based resin in the reinforcing fiber bundle is preferably 0.3 to 5% by mass, more preferably 0.4 to 5% by mass, particularly preferably 0.5 to 4% by mass, most preferably 0.5 to 3% by mass.

The reinforcing fiber bundle in this embodiment tends not to cause a fuzz shape or a shape change such as collapse, peeling or breakage due to environmental factors such as impact, or a shape change such as a fine powder caused by them. It is presumed that this is because the relatively high molecular weight polypropylene resin is contained in a relatively large amount, and effects such as entanglement of the molecular chains suppress the above problem. Particularly in the case of fibers with a large number of filaments, it is found in the study of the present invention that fuzz tends to occur, and the effect of using the butene-based resin (A) tends to function more effectively in the embodiment with a large number of filaments.

The butene-based resin in this the embodiment is a resin having a structural unit derived from butene in a proportion exceeding 50 mol %, and may have a structural unit derived from a monomer other than butene. The proportion of structural units derived from butene is preferably 55 mol % or more, more preferably 60 mol % or more, particularly preferably 70 mol % or more, and most preferably 90 mol % or more, from the viewpoint of affinity to the matrix resin and affinity to an olefin-based resin containing at least a carboxylic acid salt which is mixed with the butene resin. On the other hand, when a relatively soft butene-based resin is required, it is preferably a random or block copolymer. The proportion of structural units derived from butene in this case is preferably 50 to 90 mol %, more preferably 70 to 90 mol %, and particularly preferably 75 to 85 mol %. Examples of monomers other than butene (copolymerizable monomers) include α-olefins other than butene, conjugated dienes and non-conjugated dienes. These copolymerizable monomers may be used in combination of two or more. Specific examples of the α-olefin include α-olefins having 2 to 20 carbon atoms except for butene, such as ethylene, propylene, 3-methyl-1-butene, 4-methyl-1-pentene, 3-methyl-1-pentene, 4-methyl-1-hexene, 4,4-dimethyl-1-hexene, 1-nonene, 1-octene, 1-heptene, 1-hexene, 1-decene, 1-undecene, 1-dodecene, 1-tetradecene, 1-hexadecene, 1-octadecene and 1-eicosene. Among them, propylene, ethylene, 4-methyl-1-pentene and 1-hexene are preferable, and ethylene, propylene and 4-methyl-1-pentene are more preferable. Specific examples of the conjugated diene and non-conjugated diene include butadiene, ethylidene norbornene, dicyclopentadiene and 1,5-hexadiene.

In this embodiment, the preferable range of the hardness and the modification amount of the butene-based resin is the same as the propylene-based resin (A) described above. However, in many cases, it is preferable that the butene-based resin is a modified product.

In this embodiment, the olefin-based resin containing at least the carboxylic acid salt which is mixed with the butene-based resin is preferably a propylene-based resin (B) containing at least the carboxylic acid salt bonded to the polymer chain described above.

The resin impregnated fiber reinforced composition used in the present invention may contain a dye (II) that absorbs light with a wavelength of 300 to 3000 nm. As such a dye, known substances can be used without limitation, but preferably a carbon-based dye, more preferably carbon black is used.

The amount of the dye (II) in the resin impregnated fiber reinforced composition is 0.01 to 5 parts by mass (provided that the sum of the component (I) and the component (C) is taken as 100 parts by mass). The lower limit value is preferably 0.1 parts by mass or more, more preferably 0.2 parts by mass or more. On the other hand, the upper limit value is preferably 3 parts by mass or less, more preferably 2 parts by mass or less.

By containing the dye (II) in the resin impregnated fiber reinforced composition, it is expected that local heat generation by laser described later can be suppressed and the whole resin composition can be easily heated more uniformly. As a result, it is possible to suppress deterioration or deformation of the matrix resin, more specifically, surface protrusion of the fiber, and deterioration of the surface smoothness and appearance. Further, the resin coating may have a multilayer structure having a plurality of layers having different dye (II) content rates, or may have a multilayer structure including a layer not containing the dye (II).

In the layer containing the resin impregnated fiber reinforced composition (hereinafter, also referred to as "resin impregnated fiber reinforced composition layer"), it is preferable that the reinforcing fibers (C) are oriented in one direction. As a method of molding the resin impregnated fiber reinforced composition layer, there is, for example, a method of obtaining a resin impregnated fiber reinforced molded article (unidirectional material) in which reinforcing fibers (C) are oriented in one direction by bringing the spreaded reinforcing fiber bundles into alignment and then bringing them into contact with a molten matrix resin. The unidirectional material can be used as it is, or a laminate can be prepared and used by laminating and integrating a plurality of materials. Moreover, it can also be cut suitably and made into a tape shape.

In the present invention, before laminating a layer such as the carbon resin impregnated fiber reinforced tape described above on a metal member, a resin coating is formed on the surface of the metal member. Then, a layer such as a carbon resin impregnated fiber reinforced tape is laminated on the resin coating by a lamination method such as a tape placement method or a tape winding method. In the present invention, the surface of the metal member may be referred to as "base", and the process of forming the resin coating may be referred to as "base treatment".

In the present invention, the resin impregnated fiber reinforced composition layer is preferably laminated by a laser fusion method. When the laser fusion method is used, problems such as winding displacement, slack and structural defects are less likely to occur in the resin impregnated fiber reinforced composition layer, and the production process is relatively simple and in a short time. For example, there is a method in which the resin impregnated fiber reinforced composition is processed into a tape shape by a known method, and this tape is brought into contact and fused with the surface of the metal member having undergone a base treatment, while melting the surface of the tape by a tape placement method or a tape winding method using a laser fusion method together. Examples of the tape placement method and the tape winding method are disclosed in, for example, JP 2005-206847 (e.g., FIG. 8) and U.S. Pat. No. 6,451,152. In the case of the tape placement method, there is, for example, a method of molding using an apparatus in which a laser irradiation unit is attached as a light source to a robot arm as disclosed on the homepage (http://www.afpt.de/welcome/) of AFPT GmbH (Germany). In addition, there are apparatuses and methods disclosed in "Development of a hybrid tail rotor drive shaft by the use of thermoplastic Automated fiber placement" and "Selective reinforcement of steel with CF/PA6 composites in a laser tape placement process: effect of surface preparation and laser angle on interfacial bond strength" published in 17-th European conference on Composite Materials, 1 to 8 (2016).

In the case of performing laser fusion, it is preferable to move the light source and the mandrel as appropriate to efficiently melt and fuse. The moving speed is 10 to 100 m/min, preferably 30 to 90 m/min, in terms of the scanning speed of the resin impregnated fiber reinforced composition tape.

The wavelength of the laser is preferably 300 to 3000 μm. This wavelength preferably includes the absorption wavelength range of the reinforcing fiber (C) and the dye (II). The power of the laser is preferably 50 W to 5 kW. When the output is too strong, the resin may be deteriorated or deformed. On the other hand, when the output is too weak, melting of the resin may not occur.

The laminate obtained by such a method can be used for various applications. For example, it can be suitably used for structures such as doors, hatches and chassis of cars, and external reinforcement parts of various containers such as pipes and pressure vessels.

<Resin Coating>

The type of the resin coating used in the present invention is not particularly limited, but it is preferred to use the same type of resin or resin composition as the propylene-based resin (A), the propylene-based resin (B) and the matrix resin used in the resin impregnated fiber reinforced composition, from the viewpoint of affinity with the resin impregnated fiber reinforced composition.

When the propylene-based resin (A) is used for the resin coating, it is a polyolefin containing an olefin unit having 2 to 20 carbon atoms, and is a propylene-based resin in which the content rate of the structural units derived from propylene is preferably 50 mol % or more, as in the case of the resin impregnated fiber reinforced composition. Also when using the propylene-based resin (B) for the resin coating, it is a propylene-based resin containing at least the carboxylic acid salt bonded to the polymer chain, as in the case of the resin impregnated fiber reinforced composition. Also when using the matrix resin for the resin coating, it is not particularly limited but is preferably a propylene-based resin (D), as in the case of the resin impregnated fiber reinforced composition.

The preferred structural unit, weight-average molecular weight, melting point and glass transition temperature when the propylene-based resin (A) and the propylene-based resin (B) are used for the resin coating; the preferred content rates of the component (A-1) and the component (A-2) in the propylene-based resin (A) and the weight-average molecular weights of the two; the preferred compounding ratio in the case of using the propylene-based resin (A) and the propylene-based resin (B) in combination; the preferred structural units, weight-average molecular weight, hardness and modification amount when the propylene-based resin (D) is used for the resin coating, are the same as in the case of the resin impregnated fiber reinforced composition.

It is preferable that the resin coating used in the present invention has a layer which does not contain a dye (II). More specifically, it is preferable that the surface in contact with the metal member be a layer not containing the dye (II). When conductive particles such as carbon black (an example of the dye (II)) come in contact with the surface of the metal member, electric erosion may occur, so it is preferable not to make direct contact.

On the other hand, when laminating the resin impregnated fiber reinforced composition layer by laser fusion described later, if the dye having a laser absorbing property is not contained, there is a concern that the laser is reflected, and the temperature does not rise by the laser irradiation, and the resin impregnated fiber reinforced composition layer may not be fused. Therefore, the resin coating preferably includes a layer containing a dye (II) such as carbon black on the surface to be laser-fused. That is, the resin coating is preferably a multilayer structure having a plurality of layers having different dye (II) content rates.

For example, the content rate of the dye (II) in the layer in contact with the metal member in the resin coating is usually 3% by mass or less, preferably 2% by mass or less, more preferably 1% by mass or less, particularly preferably 0.5% by mass or less with respect to 100% by mass of the resin used for the resin coating. On the other hand, the content rate of the dye (II) in the layer in contact with the surface to be laser-fused is preferably 4% by mass or more, more preferably 5% by mass or more, and particularly preferably 7% by mass or more. The upper limit value is preferably 40% by mass, more preferably 35% by mass, particularly preferably 30% by mass.

The thickness of the resin coating is not particularly limited, but is preferably 1 to 100 μm, more preferably 5 to 50 μm.

The method for forming the resin coating is not particularly limited, and examples thereof include known methods such as a dipping method, a coating method with a brush or a roller, and a spraying method.

<Metal Member>

The shape and thickness of the metal member used in the present invention are not particularly limited. The present invention is effective regardless of the shape and thickness of the metal member. When the resin impregnated fiber reinforced composition layer is laminated via the resin coating, the resin impregnated fiber reinforced composition layer may be laminated entirely or partially on the surface of the metal member. Hereinafter, the embodiments (1) to (3) of the present invention will be described.

(1) An Embodiment in which the Resin Impregnated Fiber Reinforced Composition Layer is Partially Laminated to the Metal Member Via the Resin Coating This embodiment (1) is particularly effective for relatively thin metal members. The thickness of the metal member in this case is usually 0.2 to 1.6 mm, preferably 0.3 to 1.0 mm. The shape of the metal member is not particularly limited, and may be a flat plate or a three-dimensional shape such as a curved plate. As a three-dimensional shape, there are, for example, general shapes such as a pyramid shape, a dome shape, a roof shape, a shape formed by dividing a pipe in half, and a shape combining these. The three-dimensional shape usually has an inflection point (for example, a vertex portion or a portion corresponding to a ridgeline in the pyramid shape) in many cases. However, the shape may not have an inflection point. The embodiment (1) is preferable because the effect of suppressing deformation of a three-dimensional shape can also be obtained.

In the embodiment (1), the method for producing a laminate preferably includes a step of forming a resin coating on the surface of a relatively thin metal member, and a step of laminating a resin impregnated fiber reinforced composition layer by a laser fusion method via the resin coating partially on the surface of the metal member. The resin coating may be formed at least on a planned position of lamination of the resin impregnated fiber reinforced composition layer on the metal member. However, it may be formed on the entire surface of the metal member.

In the embodiment (1), a ratio (Xm/Xf) in the surfaces of the metal member is usually 5/1 to 50/1, preferably 8/1 to 25/1, which is the ratio of the total area (Xm) of the surface of the metal member on the side on which the resin impregnated fiber reinforced composition layer is to be partially laminated and the area (Xf) of a part on which the resin impregnated fiber reinforced composition layer is to be partially laminated.

In the embodiment (1), when the resin impregnated fiber reinforced composition layer is laminated on the metal member, if it is partially laminated on the surface of the metal member using a laser fusion method, it is supposed that only the partially laminated resin impregnated fiber reinforced composition layer can be irradiated with the laser, only a part of the metal member is heated, and the temperature change of the metal member becomes relatively small. Therefore, even if it is a thin metal member, deformation of the metal member is suppressed during the laminate production process, and unexpected deformation is less likely to occur, and a laminate having a desired shape tends to be obtained.

In the embodiment (1), the width (Wf) of the resin impregnated fiber reinforced composition layer (in particular, the width when the resin impregnated fiber reinforced composition layer is an embodiment having a tape-like length, width, and thickness) is not particularly limited, but it is preferably 6 to 50 mm, more preferably 10 to 30 mm. It is also possible to put the tapes side by side and paste them into a substantially thicker tape. A maximum width in the surfaces of the metal member is preferably 30 to 10000 mm, more preferably 40 to 5000 mm, particularly preferably 40 to 2500 mm, which is the maximum width (corresponding side of the metal member) of the surface of the metal member on the side on which the resin impregnated fiber reinforced composition layer is to be partially laminated. A ratio (Wf/Wm) is preferably 0.01 to 0.5, more preferably 0.02 to 0.2, which is the ratio of the width (Wf) of the resin impregnated fiber reinforced composition layer and the width (Wm) of the surface of the metal member.

In the embodiment (1), in the case where the shape of the metal member is a shape such as a circle or an ellipse whose side is unknown, ¼ of the entire circumference is regarded as the side length.

In the embodiment (1), it is also preferable to partially laminate a plurality of resin impregnated fiber reinforced composition layers at different positions on the surface of the metal member. When the metal member has a curved surface in which an inflection point exists, it is preferable from the viewpoint of suppressing deformation that the fiber-reinforced resin composition layer is not laminated at the inflection point.

In the embodiment (1), the laminate has a metal member having a thickness of 0.2 to 1.6 mm and having a curved surface having an inflection point present, a resin coating described above formed on the surface of the metal member, and a resin impregnated fiber reinforced composition layer described above laminated partially on the surface of the metal substrate via the resin coating. As described above, the ratio (Xm/Xf) is 5/1 to 50/1, preferably 8/1 to 25/1, which is the ratio of the total area (Xm) of the surface of the metal member and the area (Xf) of a part on which the resin impregnated fiber reinforced composition layer is to be partially laminated. In the laminate, as described above, it is preferable to partially laminate a plurality of resin impregnated fiber reinforced composition layers at different positions on the surface of the metal member. Furthermore, it is preferable from the viewpoint of deformation suppression that the resin impregnated fiber reinforced composition layer is not laminated on an inflexion point of the metal member. Moreover, it is preferable that the layer containing a resin impregnated fiber reinforced composition is a layer laminated by a laser adhesion method according to the production method demonstrated previously.

FIGS. 1 (A) to 1(J) are schematic plan views showing an embodiment of a laminate of such an embodiment (1). As shown in these figures, on the surface of the metal member 101, lamination can be performed in various patterns in which the longitudinal directions of the plurality of resin impregnated fiber reinforced composition layers 102 are different from each other. In particular, it is preferable that the longitudinal directions of the plurality of resin impregnated fiber reinforced composition layers 102 are in a cross shape. In the cross shape embodiment, since the influence of the resin impregnated fiber reinforced composition layer 102 acts as a force in a plurality of directions of two or more axes, strain is less likely to be concentrated, and although the fiber reinforced resin composition layer 102 is laminated on only a part of the metal member 101, it tends to develop excellent strength. Further, with regard to the pattern, an optimal pattern may be appropriately selected according to, for example, the curved shape of the metal member 101 and the position of the inflection point. In addition, in the production method of the laminate of the embodiment (1), the surface of the metal member 101 is not limited to a curved surface, and a plane may be adopted.

In the embodiment (1) described above, a particularly preferred method for producing a laminate and a particularly preferred laminate are as follows.

A method for producing a laminate including a step of laminating a resin impregnated fiber reinforced composition layer on a metal member, wherein the method includes comprising a step of forming a resin coating on the surface of a metal member having a thickness of 0.2 to 1.6 mm, and a step of laminating a resin impregnated fiber reinforced composition layer containing a resin impregnated fiber reinforced composition containing (I) 20 to 80 parts by mass of a polymer having a melting point and/or a glass transition temperature of 50 to 300° C., and (C) 20 to 80 parts by mass of a reinforcing fiber (provided that the sum of the component (I) and the component (C) is taken as 100% by mass)

partially on the surface of the metal member via the above-described resin coating by a laser fusion method, and wherein a ratio (Xm/Xf) in the surfaces of the metal member is 5/1 to 50/1, which is the ratio of the total area (Xm) of the surface of the metal member on the side on which the resin impregnated fiber reinforced composition layer is to be partially laminated and the area (Xf) of a part on which the resin impregnated fiber reinforced composition layer is to be partially laminated.

A laminate having a metal member having a thickness of 0.2 to 1.6 mm and having a curved surface having an inflection point present, a resin coating formed on the surface of the metal member, and a resin impregnated fiber reinforced composition layer containing a resin impregnated fiber reinforced composition containing (I) 20 to 80 parts by mass of a polymer containing an olefin-derived unit having 2 to 20 carbon atoms and having a melting point and/or a glass transition temperature of 50 to 300° C., (II) 0.01 to 5 parts by mass of a dye that absorbs light with a wavelength of 300 to 3000 μm and (C) 20 to 80 parts by mass a reinforcing fiber partially laminated on the surface of the metal member via the resin coating (provided that the sum of the component (I) and the component (C) is taken as 100 parts by mass), wherein a ratio (Xm/Xf) in the surfaces of the metal member is 5/1 to 50/1, which is the ratio of the total area (Xm) of the surface of the metal member on the side on which the resin impregnated fiber reinforced composition layer is to be partially laminated and the area (Xf) of a part on which the resin impregnated fiber reinforced composition layer is to be partially laminated.

(2) An Embodiment in which the Metal Member is a Container Substrate Having a Curved Shape This embodiment (2) is particularly effective in producing a laminated container such as a pressure container. In the embodiment (2), when laminating a resin impregnated fiber reinforced composition layer on a container substrate which has a curved shape, in the case of laminating using a laser fusion method, problems such as winding displacement, slack and structural defects are less likely to occur in the resin impregnated fiber reinforced composition layer, and the production process is relatively simple and in a short time. Specifically, for example, the resin impregnated fiber reinforced tape does not easily shift during and after bonding the tape to the particularly curved surface portion of the container substrate. If there is no winding displacement, the tape can be wound in layers, so that the strength of the container can be increased. Moreover, since it is not necessary to raise the temperature of a container substrate when bonding a tape, it is not necessary to consider the difference of the thermal expansion coefficient of a container substrate and a tape, and there is no possibility that a tape may peel off after cooling.

Furthermore, in the embodiment (2), since it is not necessary to use an organic solvent at the time of winding, the problem that the amount of a resin is difficult to be uniform does not occur. Moreover, since an olefin-based resin is used as a matrix resin of a resin impregnated fiber reinforced composition, it tends to be able to obtain a container excellent in impact resistance as compared with the conventional method using a thermosetting resin. In addition, when an olefin-based resin is laser-fused, structural defects of the resin are less likely to occur as compared to the case where a thermosetting resin is thermally cured. As a result, a container having a relatively thick resin impregnated fiber reinforced composition layer can be produced easily and in a short time.

Figure 4:
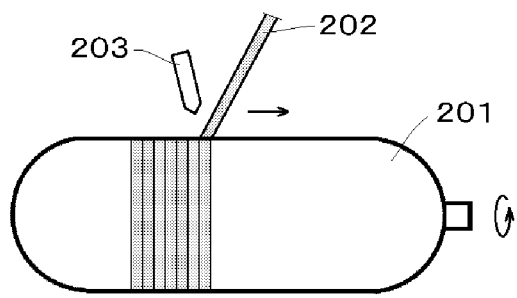
FIGS. 4(*a*) and 4(*b*) are schematic views which show examples of the production method of the laminate (laminated container) according to the embodiment (2) of the present invention.
Figure 4:
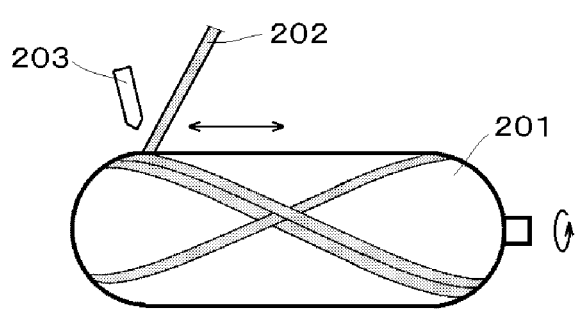

FIGS. 4(a) and 4(b) are schematic views which show two examples of the production method of the laminate of the embodiment (2) (hereinafter, also referred to as "laminated container"). In FIG. 4 (a), while rotating a container substrate 201, a tape 202 of the resin impregnated fiber reinforced composition is hoop-wound by a tape winding method on the surface of the trunk portion of the container substrate 201, and laser is irradiated from the laser irradiation device 203 simultaneously with this winding to fuse the tape 202 to the surface of the container substrate 201, and a resin impregnated fiber reinforced composition layer (hoop layer) is formed on the surface of the trunk portion of the container substrate 201. In FIG. 4 (b), while rotating the container base 201, the tape 202 of the resin impregnated fiber reinforced composition is helically wound on the surface of the trunk portion of the container base 201 by a tape winding method, and laser is irradiated from the laser irradiation device 203 simultaneously with this winding to fuse the tape 202 to the surface of the container substrate 201, and a resin impregnated fiber reinforced composition layer (helical layer) is formed on the surface of the trunk portion of the container substrate 201.

Figure 5:
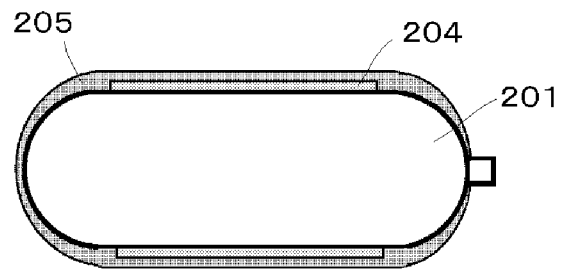
FIG. 5 is a schematic cross-sectional view which shows an example of the laminate (laminated container) according to the embodiment (2) of the present invention.

FIG. 5 is a schematic cross-sectional view showing an example of the laminated container of the embodiment (2). In FIG. 5, a hoop layer 204 is formed on the surface of the trunk portion of the container substrate 201, and a helical layer 205 is further formed thereon.

In the embodiment (2), the ratio (F/H) of the thickness (F) of the resin impregnated fiber reinforced composition layer by hoop winding to the thickness (H) of the resin impregnated fiber reinforced composition layer by helical winding is not particularly limited, but it is preferably 0.25 to 4.0, more preferably 0.33 to 3.0, and particularly preferably 0.5 to 2.0. It is preferable to set the ratio (F/H) of both thicknesses within these ranges in terms of control of the strength and failure mode of the laminated container.

Although the examples shown in the above FIGS. 4(a) and 4(b) and FIG. 5 are preferable examples of the laminated container of the embodiment (2), the embodiment (2) is not limited to these. For example, in FIGS. 4(a) and 4(b), hoop winding and helical winding are performed by the tape winding method, but other winding methods may be used. Further, although both the hoop layer 204 and the helical layer 205 are formed as the resin impregnated fiber reinforced composition layer in FIG. 5, only one of them may be formed, and other resin impregnated fiber reinforced composition layers may be formed.

In the embodiment (2), the thickness of the resin impregnated fiber reinforced composition layer is usually 1000 to 50000 µm, preferably 2000 to 50000 µm, more preferably 3000 to 25000 µm, and particularly preferably 4000 to 10000 µm. As described above, even if the thickness of the resin impregnated fiber reinforced composition layer is relatively large, the resin impregnated fiber reinforced composition layer can be formed without any problem according to the embodiment (2).

In the embodiment (2) demonstrated above, a particularly preferable production method of a laminate and a particularly preferable laminate are as follows.

A method for producing a laminate including a step of laminating a resin impregnated fiber reinforced composition layer on a metal container substrate having a curved shape (that is, a laminated container), wherein the method includes
 a step of forming a resin coating on the metal container substrate, and
 a step of laminating a resin impregnated fiber reinforced composition layer containing a resin impregnated fiber reinforced composition containing
 (I) 20 to 80 parts by mass of a polymer containing an olefin-derived unit having 2 to 20 carbon atoms and having a melting point and/or a glass transition temperature of 50 to 300° C., and
 (C) 20 to 80 parts by mass of a reinforcing fiber
 (provided that the sum of the component (I) and the component (C) is taken as 100 parts by mass)
 via the resin coating by a laser fusion method.

A laminate (that is, a laminated container) having
 a metal container substrate having a curved shape,
 a resin coating located on the surface of the metal container substrate, and
 a resin impregnated fiber reinforced composition layer having a thickness of 1000 to 50000 µm containing a resin impregnated fiber reinforced composition containing
 (I) 20 to 80 parts by mass of a polymer containing an olefin-derived unit having 2 to 20 carbon atoms and having a melting point and/or a glass transition temperature of 50 to 250° C., and
 (C) 20 to 80 parts by mass of a reinforcing fiber
 (provided that the sum of the component (I) and the component (C) is taken as 100 parts by mass).

(3) An Embodiment in which the Metal Member is a Metal Rotor Body

This embodiment (3) is particularly effective in producing automotive rotating parts such as a torque converter and a cover of a CVT pulley. In the embodiment (3), since the rotor body is reinforced by the resin impregnated fiber reinforced composition layer, even when the metal plate constituting the outer shape of the rotor body is thinned for weight reduction, the rotor is less susceptible to deformation or breakage due to centrifugal force. Additionally, since a resin impregnated fiber reinforced composition layer is laminated after forming a resin coating, it is excellent also in peel strength and surface properties. Therefore, it is advantageous not only in weight reduction of the rotor but also in, for example, downsizing of the rotor, simplification of the structure, reduction of production cost, and reduction of the number of parts.

Furthermore, in the embodiment (3), when the resin impregnated fiber reinforced composition layer is laminated by the laser fusion method, problems such as winding displacement, slack and structural defects hardly occur in the resin impregnated fiber reinforced composition layer, and the production process is relatively simple and in a short time, and a relatively thick resin impregnated fiber reinforced composition layer can be laminated well. In particular, if problems such as winding displacement, slack and variations in layer thickness occur, the center of gravity of the rotor may be displaced, which may cause rotational blur. It is important in a rotor to prevent such problems. For example, if a tape of a resin reinforced by fiber is wound around the outer peripheral surface of the rotor body and laminated simultaneously using a laser fusion method such as laser winding molding, the tape does not easily shift during and after tape bonding to the curved portion. Moreover, since it is not necessary to raise the temperature of the rotor body when bonding a tape, it is not necessary to consider the difference in thermal expansion coefficient between the rotor body and the tape, and there is no risk of peeling off the tape after cooling. In addition, it is also expected that the deformation due to heat at the time of bonding to the rotor is suppressed, and that it is difficult to cause the displacement of the rotation axis of the resulting rotor. Moreover, since it is not necessary to use an organic solvent at the time of winding, the problem that the amount of a resin does not easily become uniform does not arise.

Figure 6:
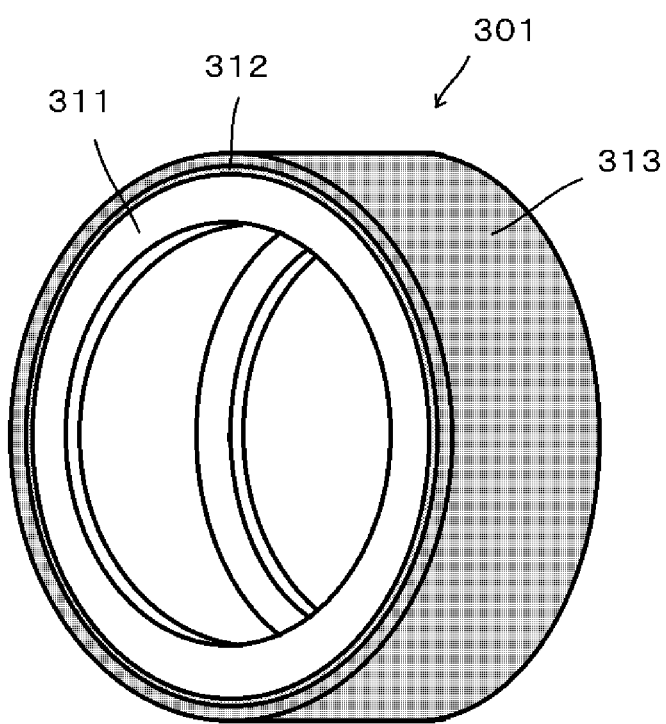
FIG. 6 is a perspective view showing an example of the laminate (rotor) according to the embodiment (3) of the present invention.

FIG. 6 is a perspective view showing an example of the rotor of the embodiment (3). In the rotor 301 shown in FIG. 6, the resin coating 312 is formed on the entire surface of the outer surface of the rotation peripheral part of the metal rotor body 311, and the resin impregnated fiber reinforced composition layer 313 is further formed on the resin coating 312. As described above, the rotor 301 in which the resin impregnated fiber reinforced composition layer 313 is laminated at least on the outer surface of the rotation peripheral part of the metal rotor body 311 is preferable from the viewpoint of preventing deformation or breakage due to centrifugal force.

The outer surface of the rotation peripheral part of the metal rotor body 311 means the outer surface of the edge located at a position away from the rotation axis, and in the case of the rotor 301 shown in FIG. 6, the outer peripheral surface of the rotor body 311 on which the resin coating 312 and the resin impregnated fiber reinforced composition layer 313 are formed corresponds to this. In the rotor 301 shown in FIG. 6, the entire outer peripheral surface of the rotor body 311 is a flat peripheral surface parallel to the rotation axis, but the embodiment (3) is not limited to this, and the outer periphery thereof may be partially curved. A specific example of the curved shape such that a part of the outer peripheral surface (for example, the corner of the outer peripheral surface) has a desired curvature includes the shape of a donut-shaped torque converter.

The reinforcing fibers (C) in the resin impregnated fiber reinforced composition layer 313 are preferably oriented in one direction, and in particular, more preferably oriented in the rotational direction (circumferential direction) of the rotor to prevent deformation or breakage due to centrifugal force.

Figure 8:
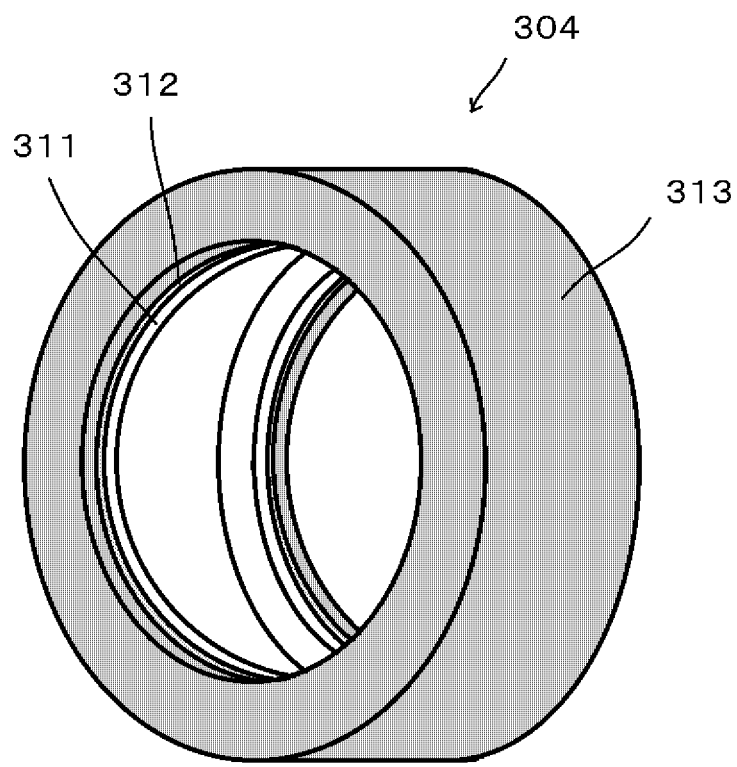
FIG. 8 is a perspective view showing another example of the laminate (rotor) according to the embodiment (3) of the present invention.

Although the lamination method of the resin impregnated fiber reinforced composition layer 313 is not particularly limited, it is preferable to laminate by a laser fusion method. For example, as shown in FIG. 6, when laminating the resin impregnated fiber reinforced composition layer 313 on the outer surface of the rotation peripheral part of the metal rotor body 311, it is preferable to laminate by the laser fusion method by tape winding. Moreover, as shown in FIG. 8 mentioned later, when laminating the resin impregnated fiber reinforced composition layer 313 on the side surface of the metal rotor body 311, it is preferable to laminate by the laser fusion method by tape placement.

In the case of performing laser fusion by the tape winding method, for example, the tape is brought into contact with the surface of the rotor body and fused by the tape winding method while melting the tape of the resin impregnated fiber reinforced composition by irradiation with laser.

Figure 7A:
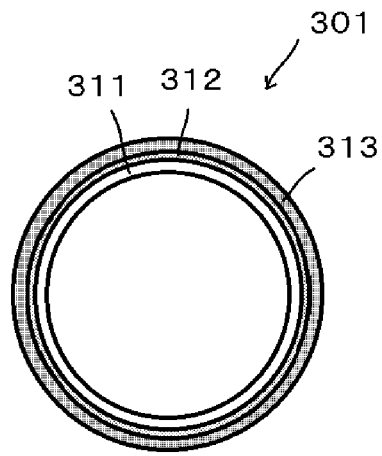
FIG. 7 (A) is a schematic cross-sectional view of the rotor shown in FIG. 6, and FIGS. 7 (B) and 7 (C) are schematic cross-sectional views showing other examples.
Figure 7B:
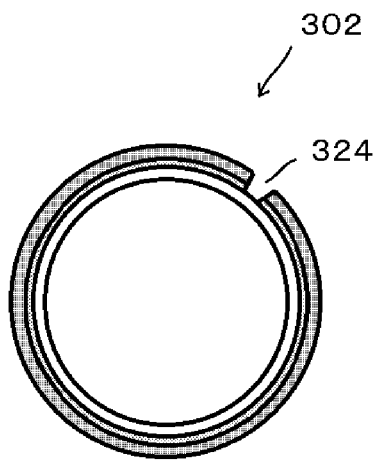
Figure 7C:
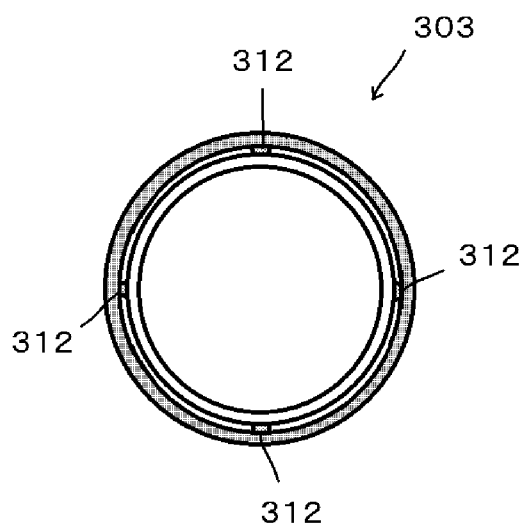

FIG. 7 (A) is a schematic cross-sectional view of the rotor 301 shown in FIG. As shown in FIG. 7 (A), in the rotor 301, the resin coating 312 and the resin impregnated fiber reinforced composition layer 313 are laminated on the entire surface of the outer surface of the rotation peripheral part of the metal rotor body 311. However, the embodiment (3) is not limited to this. For example, it is also considered possible to prevent the adverse effects due to dimensional change caused by swelling or contraction of the metal rotating body in the circumferential direction, by providing an uncoated portion 324 in which the resin coating and the resin impregnated fiber reinforced composition layer are not formed on a part of the outer surface of the rotating peripheral portion of the metal rotor body as in the rotor 302 shown in FIG. 7 (B). Further, for example, it is also considered possible to prevent adverse effects due to dimensional change caused by swelling or contraction of the metal rotor body in the diametrical direction, by forming the resin coating 312 only on a part of the outer surface of the rotation peripheral part of the metal rotor body, not on the entire surface of it, thereby partially providing a part where the resin impregnated fiber reinforced composition layer is not sufficiently adhered, as in the rotor 303 shown in FIG. 7 (C).

In the rotor 301 shown in FIG. 6, the resin coating 312 and the resin impregnated fiber reinforced composition layer 313 are laminated on the outer surface of the rotation peripheral part of the metal rotor body 311. However, the embodiment (3) is not limited to this. For example, the resin coating 312 and the resin impregnated fiber reinforced composition layer 313 may be laminated and formed not only on the outer surface of the rotation peripheral part of the metal rotor body 311 but also on the side surface of the metal rotor body 311, as in the rotor 304 shown in FIG. 8.

Figure 9:
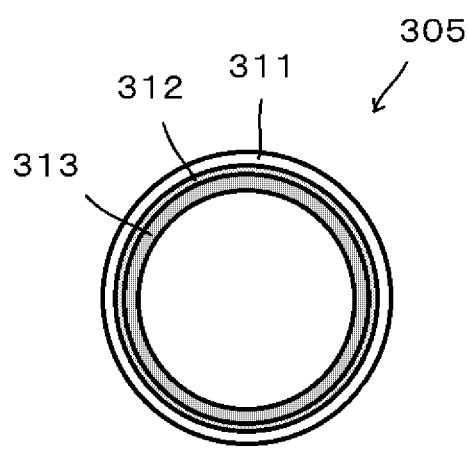
FIG. 9 is a schematic cross-sectional view showing another example of the laminate (rotor) according to the embodiment (3) of the present invention.

Furthermore, the resin coating 312 and the resin impregnated fiber reinforced composition layer 313 may be laminated and formed not on the outer surface of the rotation peripheral part of the metal rotor body 311 but on the inner surface, as in the rotor 305 shown in FIG. 9. Moreover, the resin coating 312 and the resin impregnated fiber reinforced composition layer 313 may be laminated and formed on both the outer surface and the inner surface.

In the embodiment (3), the thickness of the resin impregnated fiber reinforced composition layer is preferably 2000 to 50000 μm, more preferably 3000 to 25000 μm, and particularly preferably 4000 to 10000 μm. As described above, even if the thickness of the resin impregnated fiber reinforced composition layer is relatively thick, the resin impregnated fiber reinforced composition layer can be formed without any problem, according to the embodiment (3).

In the embodiment (3), the resin coating may contain reinforcing fibers. However, the content rate thereof is preferably less than 20% by mass, more preferably 15% by mass or less, particularly preferably 10% by mass or less, most preferably 5% by mass or less, based on the entire resin coating. In addition, the preferable content rate of the dye is also in the same range. If the content rate of the reinforcing fiber or dye is within the above numerical range, the resin coating will be a relatively soft layer, hence, although using materials (metal rotor body and resin impregnated fiber reinforced composition layer) exhibiting different deformation rates with respect to heat and temperature, defects due to deformation of these components can be alleviated.

EXAMPLES

Hereinafter, the present invention will be described in more detail by way of examples. However, the present invention is not limited at all by these examples.

(1) Measurement of Adhesion Amount of Resin to Reinforcing Fiber Bundle

About 5 g of the reinforcing fiber bundle to which the resin was attached was taken, dried at 120° C. for 3 hours, and its weight $W_1$ (g) was measured. Next, the reinforcing fiber bundle was heated at 450° C. for 15 minutes in a nitrogen atmosphere, cooled to room temperature, and its weight $W_2$ (g) was measured. The adhesion amount was calculated by the following equation using $W_1$ (g) and $W_2$ (g).

$$\text{Adhesion amount}=[(W_1-W_2)/W2]\times100(\% \text{ by mass})$$

(2) Measurement of Weight-Average Molecular Weight of Resin

The weight-average molecular weight of the resin was determined by the GPC method under the following conditions.

Liquid chromatograph: PL-GPC 220 high temperature gel permeation chromatograph (differential refractometer built-in) manufactured by Polymer Laboratories Ltd.

Column: TSKgel manufactured by Tosoh Corporation, $GMH_{HR}$-H (S)-HT×2 and $GMH_{HR}$-H (S)×1 were connected in series.

Mobile phase medium: 1,2,4-trichlorobenzene (containing 0.025% stabilizer)

Flow rate: 1.0 ml/min

Measurement temperature: 150° C.

Preparation method of calibration curve: Standard polystyrene sample was used.

Sample concentration: 0.15% (w/v)

Sample solution volume: 500 µl

Standard sample for preparation of calibration curve: Monodispersed polystyrene manufactured by Tosoh Corporation Molecular weight calibration method: Standard calibration method (polystyrene conversion)

(3) Structural Analysis of Resin

For each resin, organic compound elemental analysis, inductively coupled plasma (ICP) emission analysis, IR (infrared absorption) spectrum analysis, $^1$H-NMR measurement and $^{13}$C-NMR measurement were carried out, and evaluation was carried out on the content ratio of the monomer structure from the amount of content elements of a propylene-based resin, identification of the structure of a functional group, and peak intensities of each assigned proton and carbon. Organic compound elemental analysis was performed using organic elemental analyzer 2400II (manufactured by PerkinElmer). ICP emission analysis was performed using ICPS-7510 (manufactured by Shimadzu Corporation). IR spectrum analysis was performed using IR-Prestige-21 (manufactured by Shimadzu Corporation). $^1$H-NMR measurement and $^{13}$C-NMR measurement were performed using a JEOL JNM-GX400 spectrometer (manufactured by JEOL Ltd.).

(4) Measurement of Carboxylic Acid Salt Content of Resin

The carboxylic acid salt content and the non-neutralized carboxylic acid content were measured by performing the following operation for each resin. Zero point five (0.5) g of the resin was dissolved by heating under reflux in 200 ml of toluene. This solution was titrated with 0.1 N potassium hydroxide-ethanol standard solution, and the acid value was calculated from the following formula. Phenolphthalein was used as an indicator.

$$\text{Acid value}=(5.611\times A\times F)B \text{ (mg KOH/g)}$$

A: Use amount of 0.1 N potassium hydroxide-ethanol standard solution (ml)

F: Factor of 0.1 N potassium hydroxide-ethanol standard solution (1.02)

B: Sampling amount (0.50 g)

Next, the acid value calculated by the above method was converted into the number of moles of non-neutralized carboxylic acid group using the following formula.

$$\text{Number of moles of non-neutralized carboxylic acid group}=\text{acid number}\times1000/56 \text{ (mol/g)}$$

Then, using the total number of moles (mol/g) of the carboxylic acid group calculated by separately quantifying the carbonyl carbon of the carboxylic acid group by methods such as IR, NMR and elemental analysis, the conversion of the carboxylic acid group to a neutralize salt was calculated by the following formula.

$$\text{Conversion rate }\%=(1-r)\times100(\%)$$

r: number of moles of non-neutralized carboxylic acid group/total number of moles of carboxylic acid group (5) Measurement of Number of Fuzz Caused by Friction The determination was made in the same manner as the method described in the example of Japanese Patent No. 5584977. Specifically, a number of fuzz caused by friction of 0 to 5/m was accepted, and an exceeding number was rejected.

(6) Measuring Method of Melting Point

The melting point (Tm) of the polymer was measured by a differential scanning calorimeter (DSC) with a DSC220C apparatus manufactured by Seiko Instruments Inc. Specifically, 7 to 12 mg of samples were sealed in an aluminum pan and heated from room temperature to 200° C. at 10° C./min. The sample was held at 200° C. for 5 minutes to completely melt all crystals, and then cooled at 10° C./min to −50° C. After left for 5 minutes at −50° C., the sample was heated for the second time to 200° C. at 10° C./min. The peak temperature in this second heating test was adopted as the melting point (Tm-II).

(7) Evaluation of Interfacial Shear Strength (IFSS)

The evaluation of the interfacial shear strength (fragmentation method) between the reinforcing fiber bundle and the matrix resin was measured by the following method. Two 100 µm thick resin coatings (20 cm×20 cm square) made of a matrix resin were prepared. Then, on one of the resin coatings, one 20 cm long single fiber taken out from the reinforcing fiber bundle was linearly disposed, and the other resin coating was disposed so as to sandwich the single fiber. This was pressed at 200° C. for 3 minutes under a pressure of 4 MPa to produce a sample in which single fibers were embedded in a resin. This sample was further cut out to obtain a test piece of 0.2 mm in thickness, 5 mm in width, and 30 mm in length in which single fibers were buried in the center. Furthermore, a total of 5 test pieces were produced by the same method. These five test pieces were subjected to a tensile test under the conditions of a test length of 14 mm and a strain rate of 0.3 mm/min using an ordinary tensile test jig, and the average broken fiber length (l) when breakage of the fiber did not occur was measured using a transmission optical microscope. The interfacial shear strength (τ) (MPa) by the fragmentation method was determined by the following equation.

$$\tau=(\sigma f\cdot d)/2Lc \quad Lc=(4/3)\cdot L$$

Here, Lc is a critical fiber length, L is an average value of the final fiber break length (µm), σf is a tensile strength of the fiber (MPa), d is a diameter of the fiber (µm) (Reference:

Oosawa et al., Sen'i Gakkaishi Vol. 33, No. 1 (1977)). of was determined by the following method, assuming that the tensile strength distribution of the fiber follows the Weibull distribution. That is, the relationship between the sample length and the average tensile strength was determined by the least square method from the average tensile strengths obtained for sample lengths of 5 mm, 25 mm, and 50 mm using single fibers, and the average tensile strength at the sample length Lc was calculated.

(7) Tackiness

A carbon fiber bundle obtained by the roller impregnation method described later was placed on a SUS 304 test piece and dried at 120° C. After drying, the tackiness was evaluated by 180° peel method according to the following criteria.

A: The fiber bundle is easily peeled off from SUS304.

X: The fiber bundle adheres to SUS304 and is difficult to peel off.

(8) Easiness of Spread

A carbon fiber bundle obtained by the roller impregnation method described later was slid on a metal rod heated to 100° C. or more, and the easiness of spread was evaluated based on the following criteria.

A: The fibers spread evenly.

X: The focused fiber portion remains.

The materials used in the examples are shown below.

<Reinforcing Fiber (C)>

A carbon fiber bundle (manufactured by Mitsubishi Rayon Co., Ltd., Pyrophyll (registered trademark) TR 50S 12L, filament number 12000, strand strength 5000 MPa, strand elastic modulus 242 GPa) was immersed in acetone and subjected to ultrasonic wave for 10 minutes, and then, the carbon fiber bundle was pulled up, washed three more times with acetone, and dried at room temperature for 8 hours, to remove the attached sizing agent.

Production Example A1—Production of Emulsion

One hundred (100) parts by mass of a propylene-butene-ethylene copolymer having a weight-average molecular weight of 120,000 measured by GPC and having no melting point as a propylene-based resin (A), 10 parts by mass of a maleic anhydride-modified propylene-based polymer (weight-average molecular weight Mw: 27,000, acid value: 45 mg KOH/g, maleic anhydride content rate: 4% by mass, melting point: 140° C.) as a raw material of a propylene-based resin (B) and 3 parts by mass of potassium oleate as a surfactant were mixed. This mixture was supplied at a rate of 3000 g/hr from the hopper of a twin screw extruder (PCM-30, L/D=40, manufactured by Ikegai Iron Works Corp.), and from the supply port provided in the vent portion of the extruder, a 20% aqueous potassium hydroxide solution was continuously fed at a rate of 90 g/hr and continuously extruded at a heating temperature of 210° C. The extruded resin mixture was cooled to 110° C. with a jacketed static mixer installed at the extruder port, and then poured into warm water at 80° C. to obtain an emulsion. The obtained emulsion had a solid content concentration of 45%.

The above-mentioned maleic anhydride-modified propylene-based resin is a modified resin obtained by mixing 96 parts by mass of a propylene-butene copolymer, 4 parts by mass of maleic anhydride and 0.4 parts by mass of a polymerization initiator (manufactured by NOF Corporation, Perhexa (registered trademark) 25B) and performing modification at a heating temperature of 160° C. for 2 hours.

Production Example A2—Production of Carbon Resin Impregnated Fiber Reinforced Tape The emulsion produced in Production Example A1 was attached to reinforcing fibers (C) using a roller impregnation method. Then, it was dried online at 130° C. for 2 minutes to remove low boiling point components to obtain a reinforcing fiber bundle. The adhesion amount of the emulsion was 0.87%. The fuzzing resistance of the reinforcing fiber bundle was acceptable.

Next, a resin composition was prepared containing 57 parts by mass of this reinforcing fiber bundle and 43 parts by mass of a matrix resin containing a commercially available unmodified propylene-based resin (manufactured by Prime Polymer Co., Ltd., Prime Polypro (registered trademark) J106MG, melting point 160° C.), a modified polypropylene grafted with 0.5% by mass of maleic anhydride (melt flow rate: 9.1 g/10 min, measured at 190° C. and a load of 2.16 kg according to ASTM D1238, melting point: 155° C.) and a master batch containing carbon black (PEONY (registered trademark) BLACK BMB-16117 manufactured by DIC Corporation, carbon black content rate: 40%), and a sheet with an average thickness of 150 μm was produced by a conventional method. The mass ratio of the above-mentioned unmodified propylene to the modified polypropylene was 90/10 (corresponding to a weight-average molecular weight of 300,000), and the content of carbon black was adjusted to 1% by mass of the whole resin composition (melting point of the resin: 160° C., content rate of maleic anhydride structural units with respect to the whole resin composition: 0.023% by mass, fiber volume fraction Vf: 0.4). This was cut with a slitter to obtain a resin impregnated fiber reinforced tape having a width of 12 mm and a thickness of 150 μm.

Production Example A3—Preparation of Carbon Black Dispersion

Four grams (4 g) of carbon black (manufactured by Orion engineered carbons, trade name SPEZIALSCHWARZ 4 A), 20 g of an acid-modified polyolefin (manufactured by Mitsui Chemicals, Inc., trade name XP03B, non-volatile content rate: 20% by mass), 8 g of toluene and 30 g of glass beads having a diameter of 2 mm were poured into a 75 ml mayonnaise bottle and shaken with a shaker for 6 hours to disperse carbon black. Next, 12.2 g of toluene was added, and after shaking for an additional 1 hour with a shaker, the glass beads were separated by filtration using a 100 mesh nylon filter cloth, to obtain 38 g of a carbon black dispersion having a non-volatile content rate of 18%.

Production Example 4—Preparation of Carbon Black 5% Base Treatment Material

In a 50 ml sample bottle, 18 g of an acid-modified polyolefin dispersion (manufactured by Mitsui Chemicals, Inc., trade name R-300, nonvolatile content rate: 18%) and 2 g of the carbon black dispersion obtained in Production Example A3 were charged and shaken well, to obtain 20 g of a base treatment material containing 5% carbon black.

Production Example A5—Preparation of Carbon Black 10% Base Treatment Material

In a 50 ml sample bottle, 16 g of an acid-modified polyolefin dispersion (manufactured by Mitsui Chemicals, Inc., trade name R-300, non-volatile content rate: 18%) and 4 g of the carbon black dispersion obtained in Production Example A3 were charged and shaken well, to obtain 20 g of a base treatment material containing 10% carbon black.

Production Example A6—Preparation of Carbon Black 20% Base Treatment Material

In a 50 ml sample bottle, 12 g of an acid-modified polyolefin dispersion (manufactured by Mitsui Chemicals, Inc., trade name: R-300, nonvolatile content rate: 18%) and 8 g of the carbon black dispersion obtained in Production Example A3 were charged and shaken well, to obtain 20 g of a base treatment material containing 20% carbon black.

Example A1

An acid-modified polyolefin (manufactured by Mitsui Chemicals, Inc., trade name XP10B, non-volatile content rate: 20%) was placed in a line on one end of an aluminum plate (material A1050P, width 60 mm×length 120 mm×thickness 1 mm) with a syringe, and coated by the No. 6 bar coater. After drying at room temperature for 15 minutes, the base treatment material containing 5% carbon black produced in Production Example A4 was similarly placed in a line on one end of an aluminum plate with a syringe, and coated by the No. 20 bar coater on the dry coating of XP10B. After drying for 15 minutes at room temperature, it was put into an oven at 200° C. After 90 seconds, it was taken out and allowed to cool to room temperature, to obtain a test piece of aluminum coated with a black base treatment material. Onto this resin coating, the tape with a width of 12 mm produced in Production Example A2 was fused by laser placement molding until the length of the test piece using a robot equipped with an AFPT "STWH INB" type winding head for closed loop control of diode laser with an output of 3 kW and a wavelength of 960 to 1070 nm, to obtain a sample in which the 200 mm-long tape was extruded. The laser output for laser placement molding was 900 W, and the head moving speed was 9 m/min.

Example A2

An aluminum test piece coated with a black base treatment material was obtained in the same manner except that the No. 20 bar coater in Example A1 was changed to the No. 40 bar coater. The same laser placement molding as in Example A1 was conducted.

Example A3

An aluminum test piece coated with a black base treatment material was obtained in the same manner except that the base treatment material containing 5% carbon black in Example A1 was changed to the base treatment material containing 10% carbon black produced in Production Example A5. The same laser placement molding as in Example A1 was conducted.

Example A4

An aluminum test piece coated with a black base treatment material was obtained in the same manner except that the No. 20 bar coater in Example A3 was changed to the No. 40 bar coater. The same laser placement molding as in Example A1 was conducted.

Example A5

An aluminum test piece coated with a black base treatment material was obtained in the same manner except that the base treatment material containing 5% carbon black in Example A1 was changed to the base treatment material containing 20% carbon black produced in Production Example A6. The same laser placement molding as in Example A1 was conducted.

Example A6

An aluminum test piece coated with a black base treatment material was obtained in the same manner except that the No. 20 bar coater in Example A5 was changed to the No. 40 bar coater. The same laser placement molding as in Example A1 was conducted.

Reference Example A1

An aluminum test piece coated with a transparent base treatment material was obtained in the same manner except that the base treatment material containing 5% carbon black in Example A1 was changed to an acid-modified polyolefin dispersion (R-300). The same laser placement molding as in Example A1 was conducted.

Reference Example A2

An aluminum test piece coated with a transparent base treatment material was obtained in the same manner except that the No. 20 bar coater in Reference Example A1 was changed to the No. 40 bar coater. The same laser placement molding as in Example A1 was conducted.

The following appearance evaluation and peeling test were performed on the samples of the above Examples A1 to A6 and Reference Examples A1 to A2. The results are shown in Table 1.

<Appearance Evaluation>

The evaluation items of appearance were squeezing out of a resin, protrusion of a fiber, surface smoothness and surface gloss, and visually evaluated according to the following criteria.

(Squeezing Out of Resin)

"None": There was no squeezing out of a resin of a tape.

"Observed": There was squeezing out of a resin of a tape.

(Protrusion of Fiber)

"None": There was no protrusion of a fiber of a tape.

"Observed": There was protrusion of a fiber of a tape.

(Surface Smoothness)

"A": The surface of a tape was smooth.

"B": The surface of a tape was not so smooth.

"X": The surface of a tape was not smooth.

(Surface Gloss)

"A": The surface of a tape was glossy.

"B": The surface of a tape was not so glossy.

"X": The surface of a tape was not glossy.

<Peeling Test>

The bottom of the sample aluminum piece was fixed, and the tip of the tape was attached to a spring scale and pulled at a 45° angle, and the load at the time of forced peeling was recorded and the average peel force was normalized with the width of the peel surface, to measure the peel strength (N/m).

TABLE 1

|  | Ex. A1 | Ex. A2 | Ex. A3 | Ex. A4 | Ex. A5 | Ex. A6 | Ref. Ex. A1 | Ref. Ex. A2 |
| --- | --- | --- | --- | --- | --- | --- | --- | --- |
| Carbon black (%) | 5 | 5 | 10 | 10 | 20 | 20 | 0 | 0 |
| Thickness of resin coating (μm) | 10 | 20 | 10 | 20 | 10 | 20 | 10 | 20 |
| Squeezing out of resin | None | None | None | None | None | None | Observed | Observed |
| Protrusion of fiber | None | None | None | None | None | None | None | None |
| Surface smoothness | A | A | A | A | A | A | B | B |
| Surface gloss | B | B | A | A | A | A | B | B |
| Peel strength (N/m) | 2200 | 4600 | 4000 | 4700 | 4400 | 5000 | Not adhered | 400 |

As shown in Table 1, the samples of Examples A1 to A6 were free from squeezing out of the resin and protrusion of the fibers, and the surface smoothness and the surface gloss were also good. In addition, when the peeling surface after the peeling test was observed with an electron microscope (manufactured by JEOL Ltd.), there was no peeling of a matrix resin part. That is, the peeling surface exhibited interfacial peeling between the reinforcing fiber and the resin and partial breakage of the reinforcing fiber.

In the samples of Reference Examples A1 and A2 in which carbon black was not used for the resin coating, the tape did not adhere during lamination, or the peel strength was very low. Furthermore, the resin was squeezed out, and the surface smoothness and surface gloss were also slightly inferior.

Production Example B1—Production of Emulsion

An emulsion having a solid content concentration of 45% was obtained in the same manner as in Production Example A1 except that 100 parts by mass of a propylene-butene copolymer having a Shore D hardness of 52, a weight-average molecular weight of 350,000 measured by GPC and a melting point of 80° C. as a propylene-based resin (A) and 10 parts by mass of a maleic anhydride-modified propylene-based polymer (weight-average molecular weight Mw: 20,000, acid value: 45 mg KOH/g, maleic anhydride content rate: 4% by mass, melting point: 140° C.) as a raw material of a propylene-based resin (B) were used.

Production Example B2—Production of Resin Impregnated Carbon Fiber Reinforced Tape The emulsion obtained in Production Example B1 was attached to the sizing agent-removed reinforcing fiber (C) using a roller impregnation method. Then, it was dried online at 130° C. for 2 minutes to remove low boiling point components, to obtain a reinforcing fiber bundle. The adhesion amount of the emulsion was 0.87% by mass.

Next, a resin composition was prepared containing 57 parts by mass of this reinforcing fiber bundle and 43 parts by mass of a matrix resin containing a commercially available unmodified propylene-based resin (manufactured by Prime Polymer Co., Ltd., Prime Polypro (registered trademark) J106MG, melting point 160° C.), a modified polypropylene grafted with 0.5% by mass of maleic anhydride (melt flow rate: 9.1 g/10 min, measured at 190° C. and a load of 2.16 kg according to ASTM D1238, melting point: 155° C.) and a master batch containing carbon black (PEONY (registered trademark) BLACK BMB-16117 manufactured by DIC Corporation, carbon black content rate: 40%), and a sheet with an average thickness of 150 μm was produced by an ordinary method. The mass ratio of the unmodified propylene resin to the modified polypropylene was 90/10 (corresponding to a weight-average molecular weight of 330,000), and the carbon black content was adjusted to 1% by mass of the entire resin composition (melting point of the resin: 160° C., maleic anhydride content rate with respect to the entire resin composition: 0.023% by mass, fiber volume fraction Vf: 0.4). This was cut using a slitter to obtain a 12 mm wide tape and a 36 mm wide tape.

Example B1

(Formation of Resin Coating on Flat Steel Plate)

A flat steel plate sample of cold rolled steel plate (SPCC) of A3 size (420×297 mm) with a thickness of 0.6 mm was prepared. The oil and fat adhering to the surface was wiped with a cloth impregnated with acetone. Then, an acid-modified polyolefin (manufactured by Mitsui Chemicals, Inc., trade name: XP10B, non-volatile content rate: 20% by mass) was placed in a line on one end of the steel plate with a syringe and coated with the No. 6 bar coater. After drying at room temperature for 15 minutes, the base treatment material containing 5% by mass of carbon black obtained in Production Example A4 was similarly placed in a line on one end of an aluminum plate with a syringe and coated by the No. 20 bar coater from above the dried coating of XP10B. After drying for 15 minutes at room temperature, it was put into an oven at 200° C. After 90 seconds, it was taken out and allowed to cool to room temperature, to obtain a steel plate coated with a black resin coating.

(Lamination of Resin Impregnated Carbon Fiber Reinforced Tape)

Figure 2A:
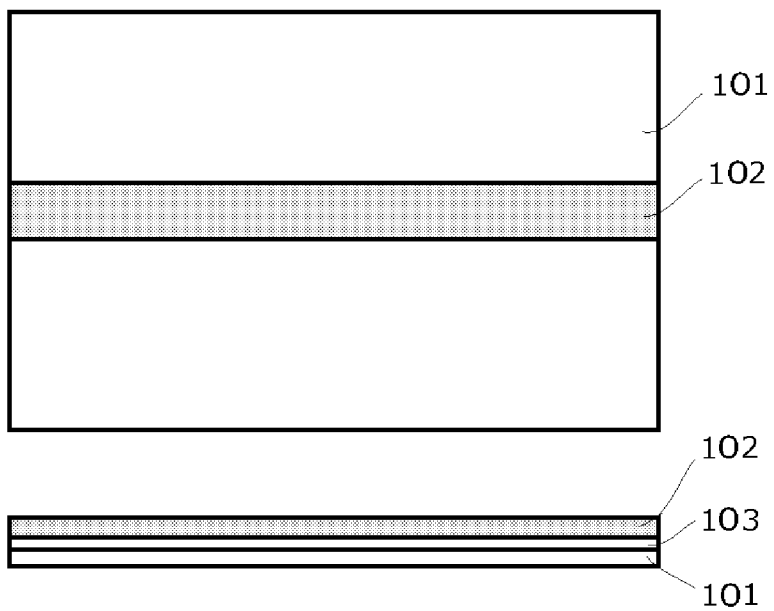
FIG. 2 (A) shows a schematic plan view and a schematic side view showing the laminate obtained in Examples B1 to B2 and Reference Examples B1 to B2, and FIG. 2 (B) is a schematic side view showing a schematic view showing the state of warpage of the laminate.
Figure 2B:
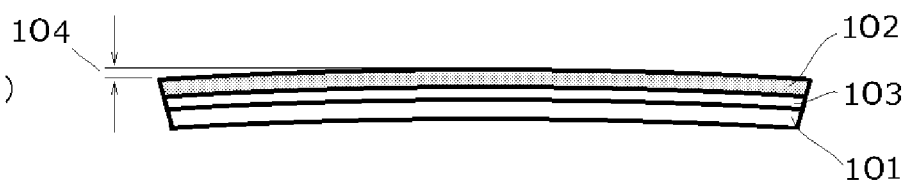

An AFPT "STWH INB" type winding head for closed loop control of diode laser with an output of 3 kW and a wavelength of 960 to 1070 nm was mounted on a robot. Using this, the resin impregnated carbon fiber reinforced tape 102 having a width of 12 mm obtained in Production Example B2 was laminated on the center of the longitudinal direction of the flat steel plate 101 with a thickness of 0.6 mm coated with the resin coating 103, by pasting by laser placement molding, as shown in FIG. 2 (A). At this time, laser placement molding was repeated so that three tapes were arranged side by side so as to have a width of 36 mm. The laser output for laser placement molding was 900 W, and the head moving speed was 9 m/min. The ratio (Xf/Xm) of the whole area (Xm) of the upper surfaces of the steel plate 101 to the area (Xf) of the portion where three resin impregnated carbon fiber reinforced tapes were laminated was 8.25/1. Furthermore, by repeating this operation, a laminate in which six layers of the tape 102 were laminated one on another in the central portion of 36 mm in width was obtained.

When this laminate was left to stand overnight to make the temperature lower to room temperature, as shown in FIG. 2 (B), warpage in which the surface side on which the resin impregnated carbon fiber reinforced tape 103 was laminated became convex occurred. However, the height 4 of the warpage was 3.5 mm, which was a relatively small warpage.

Example B2

A laminate was produced by laser placement molding in the same manner as in Example B1, except that a steel plate having a thickness of 0.4 mm was used. The height of warpage in the central portion of this laminate was 5.0 mm, which was relatively small.

Reference Example B1

First, in the same manner as in Example B1, a resin coating was formed on a steel plate having a thickness of 0.6 mm. Then, the resin impregnated carbon fiber reinforced tape having a width of 36 mm obtained in Production Example B2 was placed on the center of the longitudinal direction of the steel plate with a thickness of 0.6 mm coated with the same resin coating as in Example B1, and then the surface temperature of an iron (manufactured by Panasonic Corporation, NI-A66-K) was set to 230° C., and a mold release paper was sandwiched between the iron and the tape, and the tape was laminated by pressing and sticking the tape while melting the resin of the tape with the iron. The temperature of the steel plate at the part to which the iron was applied was 200° C. Furthermore, by repeating this operation, a laminate in which six layers of the tape 102 were laminated one on another in the central portion of 36 mm in width was obtained.

When this laminate was left to stand overnight to make the temperature lower to room temperature, the height of the warpage in the central portion was 15.5 mm, which was very larger as compared with the result of Example B1 using the same steep plate having a thickness of 0.6 mm.

Reference Example B2

A laminate was produced using an iron in the same manner as in Reference Example B1 except that a steel plate having a thickness of 0.4 mm was used. The height of the warpage in the central portion of this laminate was 18.5 mm, which was very larger as compared with the result of Example B2 using the same steel plate having a thickness of 0.4 mm.

The results of the above Examples B1 to B2 and Reference Examples B1 to B2 are summarized in Table 2 below.

TABLE 2

|  | Lamination method | Thickness of steel plate | Warpage |
|---|---|---|---|
| Ex. B1 | Laser placemen | 0.6 mm | 3.5 mm |
| Ex. B2 | Laser placement | 0.4 mm | 5.0 mm |
| Ref. Ex. B1 | Iron | 0.6 mm | 15.5 mm |
| Ref. Ex. B2 | Iron | 0.4 mm | 18.5 mm |

Example B3

(Formation of Resin Coating on Curved Steel Plate)

A flat steel plate of steel plate cold commercial (SPCC) having a thickness of 0.4 mm, a length of 650 mm, and a width of 650 mm was press-molded into a pyramid shape having a height of 50 mm, to obtain a curved steel plate sample. A curved steel plate coated with a black resin coating was obtained in the same manner as in Example B1, except that this curved steel plate sample was used.

(Lamination of Resin Impregnated Carbon Fiber Reinforced Tape)

Figure 3:
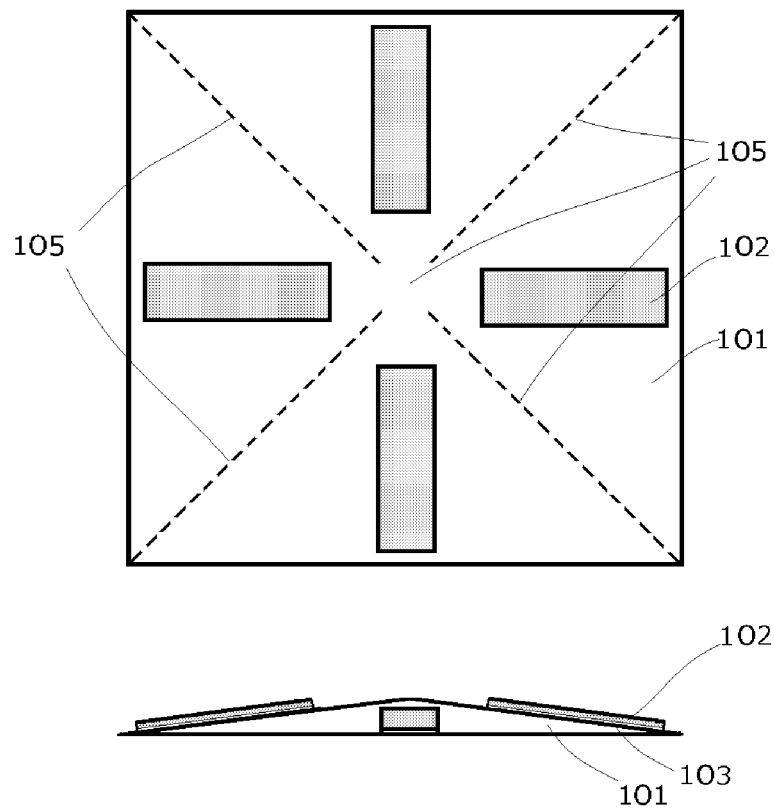
FIG. 3 shows a schematic plan view and a schematic side view showing the laminate obtained in Example B3 and Reference Example B3.

Using the same apparatus as in Example B1, the resin impregnated carbon fiber reinforced tape 102 having a width of 12 mm obtained in Production Example B2 was laminated on four portions of the pyramid surface of the curved steel plate 1 with a thickness of 0.6 mm coated with the resin coating 103 as described above, by pasting it by laser placement molding, as shown in FIG. 3. Each of four portions where the resin impregnated carbon fiber reinforced tape 102 was laminated had a width of 36 mm (three resin impregnated carbon fiber reinforced tapes 102 having a width of 12 mm were laminated side by side) and a length of 250 mm, and the ratio (Xm/Xf) is 11.7/1 (=(650×650)/(36×250×4)), which is the ratio of the total area (Xm) of the upper surfaces of this steel plate 101 and the area (Xf) of the portion where the tape 102 was laminated. Further, by repeating this operation, a laminate in which six layers of the tape 102 were laminated at each of these four portions was obtained. Here, the tape 102 is not laminated at the inflection point 5 of the curved steel plate 1.

When this laminate was left to stand overnight to bring the temperature to room temperature, the pyramid shape was deformed and its height was slightly increased. However, the height of the pyramid shape at that time was 51.5 mm, which was a relatively small deformation.

Reference Example B3

First, in the same manner as in Example 3B, a resin coating was formed on a curved steel plate having a thickness of 0.6 mm. Then, the resin impregnated carbon fiber reinforced tape having a width of 36 mm obtained in Production Example B2 was placed on four portions of the pyramid surface of the curved steel plate with a thickness of 0.6 mm coated with the same resin coating as in Example B3, and the surface temperature of an iron (manufactured by Panasonic Corporation) was set to 230° C., and a mold release paper was sandwiched between the iron and the tape, and the tape was laminated by pressing and sticking the tape while melting the resin of the tape with the iron. The temperature of the steel plate at the part to which the iron was applied was 200° C. Furthermore, by repeating this operation, a laminate in which six layers of the tape 102 were laminated one on another at the same place as in Example B3 was obtained.

When this laminate was left to stand overnight to bring the temperature to room temperature, the pyramid shape was deformed and its height increased. The height of the pyramid shape at that time was 57.5 mm, which was a very large deformation as compared with the result of Example B3.

Production Example C1—Production of Resin Impregnated Carbon Fiber Reinforced Tape The emulsion obtained in Production Example B1 was attached to the sizing agent-removed reinforcing fiber (C) using a roller impregnation method. Then, it was dried online at 130° C. for 2 minutes to remove low boiling point components, to obtain a reinforcing fiber bundle. The adhesion amount of the emulsion was 0.87% by mass.

Next, a resin composition was prepared containing 57 parts by mass of this reinforcing fiber bundle and 43 parts by mass of a matrix resin containing a commercially available unmodified propylene-based resin (manufactured by Prime Polymer Co., Ltd., trade name Prime Polypro (registered trademark) J106MG, melting point 160° C.) and a modified polypropylene grafted with 0.5% by mass of maleic anhydride (melt flow rate: 9.1 g/10 min, measured at 190° C. and a load of 2.16 kg according to ASTM D 1238, melting point: 155° C.), and a sheet with an average thickness of 150 μm was produced by an ordinary method. The weight ratio of the unmodified propylene-based resin to the modified polypropylene was adjusted to 90/10 (corresponding to a weight-average molecular weight of 330,000) (melting point of the resin: 160° C., maleic anhydride content rate with respect to the entire resin composition: 0.023% by mass, fiber volume fraction Vf: 0.4). This was cut using a slitter, to obtain a tape having a width of 12 mm and a thickness of 150 μm.

Production Example C2—Production of Resin Impregnated Carbon Fiber Reinforced Tape>

A tape was obtained in the same manner as in Production Example C1, except that the amount of the reinforcing fiber bundle was 67 parts by mass, the amount of the matrix resin was 33 parts by mass, and the fiber volume fraction Vf was changed to 0.5.

Production Example C3—Production of Resin Impregnated Carbon Fiber Reinforced Tape A tape was obtained by the same method as in Production Example C1, except that the amount of the reinforcing fiber bundles was 75 parts by mass, the amount of the matrix resin was 25 parts by mass, and the fiber volume fraction Vf was changed to 0.6.

Example C1

(Formation of Resin Coating on Metal Pressure Container Substrate)

A pressure container substrate made of an aluminum alloy and having a compressed gas volume of 500 L (57 cm in length without a valve and 10 cm in diameter) was prepared. The oil and fat adhering to the surface was wiped off with a cloth impregnated with xylene. Subsequently, an acid-modified polyolefin (manufactured by Mitsui Chemicals, Inc., trade name XP10B, non-volatile content rate 20% by mass) was diluted with toluene to a concentration of 15% and coated by spraying. After drying at room temperature for 15 minutes, the carbon black dispersion obtained in Production Example A3 was similarly coated by spray from above the dried coating of XP10B. After drying for 15 minutes at room temperature, it was put into an oven at 200° C. After 90 seconds, it was taken out and allowed to cool to room temperature, to obtain a pressure container substrate coated with a black resin coating. The thickness of the coating was 23 μm.

(Lamination of Resin Impregnated Carbon Fiber Reinforced Tape)

An AFPT "STWH INB" type winding head for closed loop control of diode laser with an output of 3 kW and a wavelength of 960 to 1070 nm was mounted on a robot. Using this, the resin impregnated carbon fiber reinforced tape 202 having a width of 12 mm obtained in Production Example C1 was laminated on the pressure container substrate 201 coated with a black resin coating, by pasting by laser winding molding while hoop-winding at an angle of 80°, as shown in FIGS. 4(a) and 4(b). On this, the resin impregnated carbon fiber reinforced tape 202 was further laminated, by pasting by laser winding molding while helical-winding at an angle of 20°. Furthermore, by repeating this operation, a resin impregnated fiber reinforced composition layer having a thickness of 9 mm formed by laminating the resin impregnated carbon fiber reinforced tape 202 was obtained. The ratio (F/H) of the thickness (F) of the resin impregnated fiber reinforced composition layer by hoop winding to the thickness (H) of the resin impregnated fiber reinforced composition layer by helical winding was 2.0.

Example C2

A resin impregnated fiber reinforced composition layer having a thickness of 7.5 mm was obtained in the same manner as in Example C1 except that the resin impregnated carbon fiber reinforced tape obtained in Production Example C2 was used. The ratio (F/H) of the thickness (F) of the resin impregnated fiber reinforced composition layer by hoop winding to the thickness (H) of the resin impregnated fiber reinforced composition layer by helical winding was 1.8.

Example C3

A resin impregnated fiber reinforced composition layer having a thickness of 4.5 mm was obtained in the same manner as in Example C1 except that the resin impregnated carbon fiber reinforced tape obtained in Production Example C3 was used. The ratio (F/H) of the thickness (F) of the resin impregnated fiber reinforced composition layer by hoop winding to the thickness (H) of the resin impregnated fiber reinforced composition layer by helical winding was 1.5.

Reference Example C1

Without conducting laser winding molding, instead, the pressure container substrate was put in an oven at 180° C. and preheated, and then, hoop winding and helical winding of the same resin impregnated carbon fiber reinforced tape as in Example C1 were performed, and thereafter, it was put in an oven at 180° C. again and pasted, to obtain a resin impregnated fiber reinforced composition layer having a thickness of 9 mm. However, misalignment of a part of the tape at the end of the pressure container substrate and cutting of a part of the carbon fibers were confirmed.

Reference Example C2

Without conducting laser winding molding, instead, hoop winding and helical winding of the same resin impregnated carbon fiber reinforced tape as in Example C1 were carried out while heating the tape using a heat gun, and then, the pressure container substrate was placed in an oven at 180° C. and pasted, to obtain a resin impregnated fiber reinforced composition layer with a thickness of 9 mm. However, misalignment of a part of the tape at the end of the pressure container substrate and cutting of a part of the carbon fibers were confirmed.

Example D1

(Formation of Resin Coating on Torque Converter)

The oil and fat adhering to the surface of a donut-shaped iron torque converter (rotor body) having a hole in the middle were wiped off with a cloth impregnated with xylene. Subsequently, an acid-modified polyolefin (manufactured by Mitsui Chemicals, Inc., trade name XP10B, non-volatile content rate: 20% by mass) was diluted with toluene to a concentration of 15% and coated by spray onto the outer circumference of the donut shape. After drying at room temperature for 15 minutes, the carbon black dispersion obtained in Production Example A3 was similarly coated by spray from above the dried coating of XP10B. After drying for 15 minutes at room temperature, the torque converter was put into an oven at 200° C. After 90 seconds, it was taken out and allowed to cool to room temperature, to obtain a torque converter coated with a black resin coating. The thickness of the coating was 23 μm.

(Lamination of Resin Impregnated Carbon Fiber Reinforced Tape)

An AFPT "STWH INB" type winding head for closed loop control of diode laser with an output of 3 kW and a wavelength of 960 to 1070 nm was mounted on a robot. Using this, the resin impregnated carbon fiber reinforced tape having a width of 12 mm obtained in Production Example C1 was laminated by pasting it by laser winding molding while being wound around the outer circumference of the torque converter coated with a black resin coating, to obtain a torque converter having a resin impregnated carbon fiber reinforced layer (corresponding to the rotor in FIGS. 6 and 7 (A)). The thickness of the resin impregnated carbon fiber reinforced composition layer was 5 mm. Though the outer peripheral surface of the torque converter (rotor body) was partially curved, the resin impregnated carbon fiber reinforced tape was completely in close contact with the torque converter.

Example D2

A resin impregnated carbon fiber reinforced tape was laminated in the same manner as in Example D1 except that only one layer was laminated by pasting it by laser winding molding while being wound leaving a part of the outer peripheral surface of the torque converter, to obtain a torque converter having a resin impregnated carbon fiber reinforced layer (corresponding to the rotor in FIG. 7 (B)). Though the outer peripheral surface of the torque converter (rotor body) was partially curved, the resin impregnated carbon fiber reinforced tape was completely in close contact with the torque converter.

Example D3

A resin impregnated carbon fiber reinforced tape was laminated in the same manner as in Example D1 except that in formation of a resin coating on a torque converter, an acid-modified polyolefin (manufactured by Mitsui Chemicals, Inc., brand name XP10B, non-volatile content rate: 20% by mass) diluted with toluene to a concentration of 15% was sprayed on only four places and the carbon black dispersion obtained in Production Example A3 was sprayed from above the dried coating of XP10B, to obtain a torque converter having a resin impregnated carbon fiber reinforced layer (corresponding to the rotor in FIG. 7 (C)). The thickness of the resin impregnated carbon fiber reinforced layer was 3 mm. Although the outer peripheral surface of the torque converter (rotor body) was partially curved, the resin impregnated carbon fiber reinforced tape was completely in close contact with the torque converter at the above four places.

Reference Example D1

Without conducting laser winding molding, instead, a torque converter (rotor body) was placed in an oven at 180° C. and preheated, and then, the same resin impregnated carbon fiber reinforced tape as in Example D1 was wound around the outer peripheral surface, and then, it was put in an oven at 180° C. again and pasted. However, misalignment of a part of the tape at the end of the torque converter and cutting of a part of the carbon fibers were confirmed. The thickness of the resin impregnated carbon fiber reinforced layer was 5 mm.

Example D4

(Formation of Resin Coating on Cover of CVT Pulley)

The oil and fat adhering to the surface of a cover (rotor body) of a cup-shaped iron CVT pulley with a hole in the middle were wiped off with a cloth impregnated with xylene. Then, an acid-modified polyolefin (manufactured by Mitsui Chemicals, Inc., trade name XP10B, non-volatile content rate: 20% by mass) was diluted with toluene to a concentration of 15% and coated by spray onto the cup-shaped outer circumference. After drying at room temperature for 15 minutes, the carbon black dispersion obtained in Production Example A3 was similarly coated by spray from above the dried coating of XP10B. After drying for 15 minutes at room temperature, it was put into an oven at 200° C. After 90 seconds, it was taken out and allowed to cool to room temperature, to obtain a cover of a CVT pulley coated with a black resin coating. The thickness of the coating was 23 μm.

(Lamination of Resin Impregnated Carbon Fiber Reinforced Tape)

An AFPT "STWH INB" type winding head for closed loop control of diode laser with an output of 3 kW and a wavelength of 960 to 1070 nm mounted on a robot was prepared. Using this, the resin impregnated carbon fiber reinforced tape having a width of 12 mm obtained in Production Example C1 was laminated by pasting it by laser winding molding while being wound around the outer peripheral surface of a cover of a CVT pulley coated with a black resin coating as described above, to obtain a cover of a CVT pulley having a resin impregnated carbon fiber reinforced layer (corresponding to the rotor in FIGS. 6 and 7 (A)). The thickness of the resin impregnated carbon fiber reinforced composition layer was 3 mm.

Production Example E1—Method for Producing Emulsion

One hundred (100) parts by mass of a butene homopolymer manufactured using a known magnesium compound-supported titanium catalyst, and having a Shore D hardness of 65 and a melt flow rate (MFR) of 0.5 g/10 min measured at 190° C. under a load of 2.16 kg according to the ASTM 1238 standard as a butene-based resin, 10 parts by mass of a maleic anhydride-modified propylene polymer (weight-average molecular weight Mw=20,000, acid value: 45 mg KOH/g) as a raw material of a propylene-based resin and 3 parts by mass of potassium oleate as a surfactant were mixed. This mixture was supplied at a rate of 3000 g/hr from the hopper of a twin screw extruder (PCM30, L/D=40, manufactured by Ikegai Iron Works Corp.), and from the supply port provided in the vent portion of the extruder, a 20% aqueous potassium hydroxide solution was continuously fed at a rate of 90 g/hr and continuously extruded at a heating temperature of 210° C. The extruded resin mixture was cooled to 110° C. with a jacketed static mixer installed at the outlet of the extruder, and then, poured into warm water of 80° C., to obtain an emulsion. The obtained emulsion had a solid content concentration of 45%.

The maleic anhydride-modified propylene-based resin was obtained by mixing 96 parts by mass of a propylene-based polymer, 4 parts by mass of maleic anhydride and 0.4 parts by mass of a polymerization initiator (Perhexa (registered trademark) 25B, manufactured by NOF Corporation) and modifying the mixture at a heating temperature of 160° C. for 2 hours.

Production Example E2—Production of Resin Impregnated Carbon Fiber Reinforced Tape The emulsion produced in Production Example E1 was attached to the reinforcing fiber (C) using a roller impregnation method. Then, it was dried online at 130° C. for 2 minutes to remove low boiling point components, to obtain a reinforcing fiber bundle. The adhesion amount of the emulsion was 0.90% by mass.

The result of tackiness was A (easily peeled off). The fuzzing resistance of the carbon fiber bundle was acceptable. The interfacial shear strength (IFSS) was measured using a mixture (mass ratio 95/5, Mw 300,000) of a commercially available unmodified propylene-based resin (manufactured by Prime Polymer Co., Ltd., trade name: Prime Polypro (registered trademark) J106MG) and a modified polypropylene grafted with 0.5% by mass of maleic anhydride (melt flow rate measured at 230° C. according to ASTM D1238: 9.1 g/10 minutes) as a matrix resin. IFSS was 19.9 MPa. The easiness of spread was A (the fibers spread uniformly).

Next, a resin composition was prepared containing 57 parts by mass of this reinforcing fiber bundle and 43 parts by mass of a mixture (mass ratio 95/5, Mw 300,000) of a commercially available unmodified propylene resin (manufactured by Prime Polymer Co., Ltd., Prime Polypro (registered trademark) J106MG) and a modified polypropylene grafted with 0.5% by mass of maleic anhydride (melt flow rate measured at 230° C. according to ASTM D1238: 9.1 g/10 minutes) as a matrix resin, and a sheet was produced by an ordinary method (fiber volume fraction Vf: 0.4). This was cut with a slitter, to obtain a resin impregnated fiber reinforced tape having a width of 12 mm and a thickness of 150 μm.

Reference Production Example E1—Production of Resin Impregnated Carbon Fiber Reinforced Tape A reinforcing fiber bundle was obtained in the same manner as in Production Example E1 except that a commercially available reinforcing carbon fiber bundle containing an epoxy compound was used. The carbon fiber bundle was in a state in which fuzz was slightly noticeable. IFSS was 11 MPa. The tackiness was X (hard to peel off). The easiness of spread was A (fibers spread uniformly).

As understood from the above-mentioned Production Example E1 and Reference Production Example E1, the reinforcing fiber bundle of Production Example E1 had excellent performance in which less fuzz and high interfacial shear strength were compatible. In addition, since the tackiness of the reinforcing fiber bundle itself is low, the handleability is excellent. Therefore, it is expected that the resin composition containing the reinforcing fiber bundle also has excellent strength and appearance.

Example E1

An acid-modified polyolefin (manufactured by Mitsui Chemicals, Inc., trade name XP10B, non-volatile content rate: 20%) was placed in a line on one end of an aluminum plate (material A1050P, width 60 mm×length 120 mm×thickness 1 mm) with a syringe, and coated by the No. 6 bar coater. After drying at room temperature for 15 minutes, the base treatment material containing 10% carbon black produced in Production Example A5 was similarly placed in a line on one end of an aluminum plate with a syringe and coated by the No. 20 bar coater from above the dried coating of XP10B. After drying for 15 minutes at room temperature, it was put into an oven at 200° C. After 90 seconds, it was taken out and allowed to cool to room temperature, to obtain a test piece of aluminum coated with a black base treatment material. Onto this resin coating, the tape with a thickness 12 mm produced in Production Example E2 was fused by laser placement molding to the length of the test piece using a robot equipped with an AFPT "STWH INB" type winding head for closed loop control of diode laser with an output of 3 kW and a wavelength of 960 to 1070 nm, to obtain a sample in which the 200 mm-long tape was extruded. The laser output for laser placement molding was 900 W, and the head moving speed was 9 m/min.

Example E2

A test piece of aluminum coated with a black base treatment material was obtained by the same operation except that the No. 20 bar coater in Example E1 was changed to the No. 40 bar coater. Then, the same laser placement molding as in Example E1 was performed.

Example E3

A test piece of aluminum coated with a black base treatment material was obtained by the same operation except that the base treatment material containing 10% carbon black in Example E1 was changed to the base treatment material containing 20% carbon black produced in Production Example A6. Then, the same laser placement molding as in Example E1 was performed.

Example E4

A test piece of aluminum coated with a black base treatment material was obtained by the same operation except that the No. 20 bar coater in Example E3 was changed to the No. 40 bar coater. Then, the same laser placement molding as in Example E1 was performed.

Reference Example E1

A test piece of aluminum coated with a transparent base treatment material was obtained by the same operation except that the base treatment material containing 10% carbon black in Example A1 was changed to an acid-modified polyolefin dispersion (R-300). The same laser placement molding as in Example E1 was performed.

Reference Example E2

A test piece of aluminum coated with a transparent base treatment material was obtained by the same operation except that the No. 20 bar coater in Reference Example E1 was changed to the No. 40 bar coater. Then, the same laser placement molding as in Example E1 was performed.

For the samples of Examples E1 to E4 and Reference Examples E1 to E2 described above, the appearance evaluation and the peeling test were performed in the same manner as in Examples A1 to A6 and Reference Examples A1 to A2. The results are shown in Table 3.

TABLE 3

|  | Ex. E1 | Ex. E2 | Ex. E3 | Ex. E4 | Ref. Ex. E1 | Ref. Ex. E2 |
|---|---|---|---|---|---|---|
| Carbon black (%) | 5 | 5 | 10 | 10 | 0 | 0 |
| Thickness of resin coating (μm) | 10 | 20 | 10 | 20 | 10 | 20 |
| Squeezing out of resin | None | None | None | None | Observed | Observed |
| Protrusion of fiber | None | None | None | None | None | None |
| Surface smoothness | A | A | A | A | B | B |
| Surface gloss | A | A | A | A | B | B |
| Peel strength (N/m) | 3850 | 4500 | 4200 | 4750 | Not adhered | Not adhered |

As shown in Table 3, the samples of Examples E1 to E4 were free from squeezing out of the resin and protrusion of fibers, and the surface smoothness and the surface gloss were also good. In addition, when the peeling surface after the peeling test was observed with an electron microscope (manufactured by JEOL Ltd.), there was no peeling of a matrix resin part. That is, the peeling surface exhibited interfacial peeling between the reinforcing fiber and the resin and partial breakage of the reinforcing fiber.

For the samples of Reference Examples E1 and E2 in which carbon black was not used for the resin coating, the tape did not adhere in lamination. Furthermore, the resin was squeezed out, and the surface smoothness and surface gloss were also slightly inferior.

INDUSTRIAL APPLICABILITY

In the laminate of the present invention, since the metal member and the resin impregnated fiber reinforced composition layer are firmly adhered to each other, and have excellent surface properties and peel strength, it is expected that they have excellent handleability and high mechanical properties. Therefore, it can be developed for various applications including pipes and pressure containers. In particular, it is suitable for automobile parts, electric/electronic parts, home/office electric appliance parts.

The laminate in the case where the metal member is thin in the embodiment (1) of the present invention can be developed for various applications, and it is very suitable particularly when used as a member having a curved surface such as an automobile outer plate (e.g., bonnet).

The laminate (laminated container) of the embodiment (2) of the present invention can be used for various applications, and is very useful particularly as a pressure container. Specific examples of the laminated container include a high pressure gas tank, a medical gas container, a cylinder for diving, and a pressure container for vehicle mounting.

The laminate (rotor) of the embodiment (3) of the present invention can be used for various applications. For example, it is suitable for engines, rotating parts of motors, pulleys, flywheels, transmission devices, torque converters, clutch parts, transmissions, CVTs, fans, rotating blades and other rotors.

EXPLANATION OF NUMERALS

101: metal member (steel plate)
102: resin impregnated fiber reinforced composition layer (resin impregnated carbon fiber reinforced tape)
103: resin coating
104: warpage height
105: inflection points
201: container substrate (pressure container substrate)
202: tape of resin impregnated fiber reinforced composition (resin impregnated carbon fiber reinforced tape)
203: laser irradiation device
204: hoop layer
205: helical layer
301, 302, 303, 304, 305: rotor
311: metal rotor body
312: resin coating
313: resin impregnated fiber reinforced composition layer
324: uncoated part

The invention claimed is:

1. A method for producing a laminate including a step of laminating a resin impregnated fiber reinforced composition layer on a metal member, wherein the method includes
a step of forming a resin coating on the metal member; and
a step of laminating a resin impregnated fiber reinforced composition layer containing a resin impregnated fiber reinforced composition containing
(I) 20 to 80% by mass of a polymer having a melting point and/or a glass transition temperature of 50 to 300° C., and
(C) 20 to 80% by mass of a reinforcing fiber
(provided that the sum of the component (I) and the component (C) is taken as 100% by mass) via the above resin coating,
wherein the resin impregnated fiber reinforced composition layer is laminated by a laser fusion method,
wherein the resin coating comprises a layer containing a dye (II) which absorbs light having a wavelength of 300 to 3000 nm, and a layer which does not contain the dye (II), and
wherein the layer which does not contain the dye (II) is in contact with the metal member.

2. The method for producing a laminate according to claim 1, wherein the resin impregnated fiber reinforced composition further contains 0.01 to 5% by mass of the dye (II) which absorbs light having a wavelength of 300 to 3000 nm (provided that the sum of the component (I) and the component (C) is taken as 100% by mass).

3. The method for producing a laminate according to claim 1, wherein the component (I) contains a carboxylic acid group, and the content rate of structural units containing the carboxylic acid group is 0.010 to 0.045% by mass (provided that the sum of the component (I) and the component (C) is taken as 100% by mass).

4. The method for producing a laminate according to claim 1, wherein the resin coating has a layer not containing conductive particles.

5. The method for producing a laminate according to claim 1, wherein the resin impregnated fiber reinforced composition layer is partially laminated to the metal member via the resin coating.

6. The method for producing a laminate according to claim 5, wherein a ratio (Xm/Xf) in the surfaces of the metal member is 5/1 to 50/1, which is the ratio of the total area (Xm) of the surface of the metal member on the side on which the resin impregnated fiber reinforced composition layer is to be partially laminated and the area (Xf) of a part on which the resin impregnated fiber reinforced composition layer is to be partially laminated.

7. The method for producing a laminate according to claim 5, wherein a maximum width in the surfaces of the metal member is 30 to 10000 mm, which is the maximum width of the surface of the metal member on the side on which the resin impregnated fiber reinforced composition layer is to be partially laminated, and a ratio (Wf/Wm) is 0.01 to 0.5, which is the ratio of the width (Wf) of the resin impregnated fiber reinforced composition layer and the width (Wm) of the surface of the metal member.

8. The method for producing a laminate according to claim 1, wherein the metal member is a container substrate having a curved shape.

9. The method for producing a laminate according to claim 8, wherein the resin impregnated fiber reinforced composition layer is formed by hoop winding and/or helical winding.

10. The method for producing a laminate according to claim 1, wherein the metal member is a metal rotor body.

11. The method for producing a laminate according to claim 10, wherein the resin impregnated fiber reinforced composition layer is laminated at least on the outer surface of the rotation peripheral part of the metal rotor body.

* * * * *